United States Patent
Zaklika et al.

(10) Patent No.: US 8,233,725 B2
(45) Date of Patent: *Jul. 31, 2012

(54) ADAPTIVE SAMPLING REGION FOR A REGION EDITING TOOL

(75) Inventors: Krzysztof Antoni Zaklika, St Paul, MN (US); Mikhail Ivanovich Trifonov, Sosnoyyi Bor (RU); Leonid Borisovich Lalyko, St Petersburg (RU)

(73) Assignee: Corel Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,583

(22) Filed: May 2, 2011

(65) Prior Publication Data

US 2011/0205237 A1    Aug. 25, 2011

Related U.S. Application Data

(60) Continuation of application No. 12/605,996, filed on Oct. 26, 2009, now Pat. No. 7,940,988, which is a division of application No. 10/940,596, filed on Sep. 14, 2004, now Pat. No. 7,609,894, which is a continuation-in-part of application No. 10/781,572, filed on Feb. 17, 2004, now Pat. No. 7,826,668.

(51) Int. Cl.
*G06K 9/62* (2006.01)

(52) U.S. Cl. ........ 382/224; 345/619; 382/163; 382/170; 382/190

(58) Field of Classification Search .......... 345/619; 382/163, 169, 170, 190, 224
See application file for complete search history.

(56) References Cited

U.S. PATENT DOCUMENTS

| | | | |
|---|---|---|---|
| 5,630,037 A | 5/1997 | Schindler | |
| 5,739,809 A | 4/1998 | McLaughlin | |
| 5,885,218 A | 3/1999 | Teo | |
| 5,896,468 A | 4/1999 | Kowalski | |
| 6,307,961 B1 | 10/2001 | Balonon-Rosen | |
| 6,385,336 B1 | 5/2002 | Jin | |
| 6,404,936 B1 | 6/2002 | Katayama | |
| 6,434,269 B1 | 8/2002 | Hamburg | |
| 6,512,855 B1 * | 1/2003 | Delean | 382/276 |
| 6,718,068 B1 | 4/2004 | Gindele | |
| 6,791,573 B2 | 9/2004 | Hamburg | |
| 6,934,421 B2 | 8/2005 | Gindele | |
| 7,092,554 B2 | 8/2006 | Chen | |
| 7,136,081 B2 | 11/2006 | Gritz | |
| 7,312,805 B1 | 12/2007 | Worthington | |

(Continued)

OTHER PUBLICATIONS

Adobe Creative Team "Adobe Photoshop CS Classroom in a Book", Dec. 1, 2003, Adobe Press, 2 pages.

(Continued)

*Primary Examiner* — Gregory M Desire
(74) *Attorney, Agent, or Firm* — Patterson & Sheridan, LLP

(57) ABSTRACT

Properties of pixels in a digital image are sampled within different subdivisions of an editing tool impression to produce different property distributions. The different subdivisions can automatically alter their size, geometry, and/or location, based on image content within one or more of the subdivisions, in order to encompass a set of pixels having a substantially uniform distribution of a pixel property. Uniformity can be defined relative to the editing operation or context of the image. The property distributions from each region are classified to identify different edit classes within the property space, which are then used to apply an edit effect to the digital image within the tool impression. The edit classes may be represented by an edit profile in two or more dimensions.

20 Claims, 17 Drawing Sheets

U.S. PATENT DOCUMENTS

| | | |
|---|---|---|
| 7,317,826 B2 | 1/2008 | Wilensky |
| 7,471,417 B1 | 12/2008 | Chien |
| 7,693,341 B2 * | 4/2010 | Pettigrew et al. ............. 382/254 |
| 2002/0057823 A1 | 5/2002 | Shamma |
| 2002/0076096 A1 | 6/2002 | Silber |
| 2002/0135743 A1 | 9/2002 | Gindele |
| 2003/0039402 A1 | 2/2003 | Robins |
| 2003/0179944 A1 | 9/2003 | Gindele |
| 2004/0081346 A1 | 4/2004 | Louden |
| 2004/0090597 A1 | 5/2004 | De Haan |
| 2004/0155881 A1 | 8/2004 | Kotani |
| 2005/0001824 A1 | 1/2005 | Yoshimura |
| 2005/0089216 A1 * | 4/2005 | Schiller et al. ................ 382/159 |
| 2005/0180596 A1 | 8/2005 | Abe |
| 2005/0180648 A1 | 8/2005 | Curry |
| 2005/0180659 A1 | 8/2005 | Zaklika |
| 2006/0215922 A1 | 9/2006 | Koch |
| 2010/0073401 A1 | 3/2010 | Zaklika |

OTHER PUBLICATIONS

W.A. Barrett et al "Object Based Image Editing", ACM Transactions on Graphics, Jul. 2002, pp. 777-784, vol. 21, No. 3.

J.H.Elder et al "Image Editing in the Contour Domain", IEEE Trans. on Pattern Analysis and Machine Intelligence, Mar. 2001, vol. 23, No. 3.

* cited by examiner

ADAPTIVE SAMPLING REGION FOR A REGION EDITING TOOL

CROSS-REFERENCE TO RELATED APPLICATIONS

This application is a continuation of U.S. patent application Ser. No. 12/605,996 filed Oct. 26, 2009, now U.S. Pat. No. 7,940,988 which is a divisional of U.S. patent application Ser. No. 10/940,596, entitled "Adaptive Sampling Region for a Region Editing Tool", filed Sep. 14, 2004, now U.S. Pat. No. 7,609,894 which is a continuation-in-part of U.S. patent Ser. No. 10/781,572, entitled "Adaptive Region Editing Tool", filed Feb. 17, 2004, now U.S. Pat. No. 7,826,668 both of which are incorporated herein by reference for all that they disclose and teach.

FIELD OF THE INVENTION

The invention relates generally to image editing, and more particularly to an image region editing tool.

BACKGROUND OF THE INVENTION

Digital image editing has made many sophisticated graphics and multimedia editing capabilities accessible to a large number of professionals and consumers. Users can edit digital images, such as photographs, video frames, computer graphics, etc., using reasonably-priced image editing software. Such software can execute on a variety of computers, including graphics workstations, desktop computers, and laptop computers, however, depending on the user's abilities, some of these sophisticated editing capabilities may still present tasks that are too complex or too time-consuming for many users to perform with acceptable results.

One common image editing operation involves the selective editing of a region in the image. For example, given a still digital image (e.g., a digital photograph or a video frame) of a human subject, a user may wish to remove (e.g., erase) the background in the image (e.g., an office environment) and replace it with a different background (e.g., a beach scene). In one approach, region erasure of the background can be accomplished manually, pixel-by-pixel, by changing the color and/or opacity of each pixel of the background. However, not only can this approach be tedious and very time-consuming, manually determining the appropriate color and translucence of each pixel on the boundary between the subject and the background can be quite complicated. First, it can be difficult to correctly identify which pixels are actually in the human subject and which pixels are in the background, particularly when the subject has a complex shape or very fine attributes. Furthermore, some pixels include a blend of both subject and background and, therefore, may require some manual "unblending" of colors from the subject and the background to produce a satisfactory result. However, manual unblending can be extremely difficult and often unworkable for many users. Accordingly, the effort required to employ a manual approach may be unacceptable for the quality of the result achieved.

Some more automated approaches for editing a region can be used. For example, to erase a background around a subject in an image, a user may designate a clipping path that generally distinguishes the subject from the background. The region designated outside the clipping path is erased, and the boundary of the clipped region can be blurred or blended to substantially minimize the influence of the remaining background on the clipped subject. Although this clipping approach is less manual than a pixel-by-pixel approach, the approach typically relies on a user specifying the clipping path closely around the boundary of the subject in order to achieved acceptable results. The more background that remains in the clipped subject. The more influence the remaining background has on the resulting edited image—an undesirable effect. Furthermore, such blending or blurring tends to decrease the sharpness of the subject boundary, even though sharpness is frequently a primary desirable characteristic.

Other approaches employ automated visual blending techniques that do not require clipping. However, such existing approaches define an individual erasure color based on analysis of a single region of a tool impression. These approaches fail to take sufficient advantage of the instructive effort of a user, who is capable of communicating useful information about different regions within a tool impression simply by his or her placement of the tool within the image. Furthermore, while instructive user input is helpful, existing editing tools do not adequately optimize their sampling geometry based on image region content to provide enhanced results.

Implementations described and claimed herein sample properties of pixels in a digital image within different subdivisions of an editing tool impression to produce different property distributions. In one implementation, the subdivisions are differently located within the tool impression. The property distributions from these subdivisions are classified to identify different edit classes within the property space, which are then used to apply an edit effect to the digital image within the tool impression.

At least one of the subdivisions of the tool impression may be used to sample pixel properties in order to edit some of the pixels within the tool impression. In some implementations, the sampling region may automatically alter in size, geometry, and/or location based on image content within the sampling region. Such alterations may be controlled by a sampling criterion, such as a uniformity metric, a standard deviation, a sampling trend criterion, and other statistical and non-statistical parameters.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing a computer process on a computer system. Pixels in a first region within a tool impression in a digital image are sampled to determine a first distribution of a pixel property of the pixels in the first region. The first region within the tool impression is modified to encompass a set of additional pixels within the tool impression. A second distribution of the pixel property is determined based on the pixels in the modified first region. Pixels in a second region within the tool impression are sampled to determine a third distribution of the pixel property of the pixels in the second region. At least one pixel within the tool impression is edited based on the second and third distributions.

In another implementation, a method is provided. Pixels in a first region within a tool impression in a digital image are sampled to determine a first distribution of a pixel property of the pixels in the first region. The first region within the tool impression is modified to encompass a set of additional pixels within the tool impression. A second distribution of the pixel property is determined based on the pixels in the modified first region. Pixels in a second region within the tool impression are sampled to determine a third distribution of the pixel property of the pixels in the second region. At least one pixel within the tool impression is edited based on the second and third distributions.

In yet another implementation, a system is provided. A region sampling module samples pixels in a first region within a tool impression in a digital image to determine a first distribution of a pixel property of the pixels in the first region. The region sampling module also samples pixels in a second region within the tool impression to determine a second distribution of the pixel property of the pixels in the second region. An adaptive sampling region module modifies the first region within the tool impression to encompass a set of additional pixels within the tool impression and determines a third distribution of the pixel property based on the pixels in the modified first region. An editing module edits at least one pixel within the tool impression based on the second and third distributions.

In yet another implementation, a system includes means for sampling pixels in a first region within a tool impression in a digital image to determine a first distribution of a pixel property of the pixels in the first region, means for modifying the first region within the tool impression to encompass a set of additional pixels within the tool impression, means for determining a second distribution of the pixel property based on the pixels in the modified first region, means for sampling pixels in a second region within the tool impression to determine a third distribution of the pixel property of the pixels in the second region, and means for editing at least one pixel within the tool impression based on the second and third distributions.

BRIEF DESCRIPTION OF THE DRAWINGS

Other implementations are also described and recited herein.

DETAILED DESCRIPTION

Figure 1:
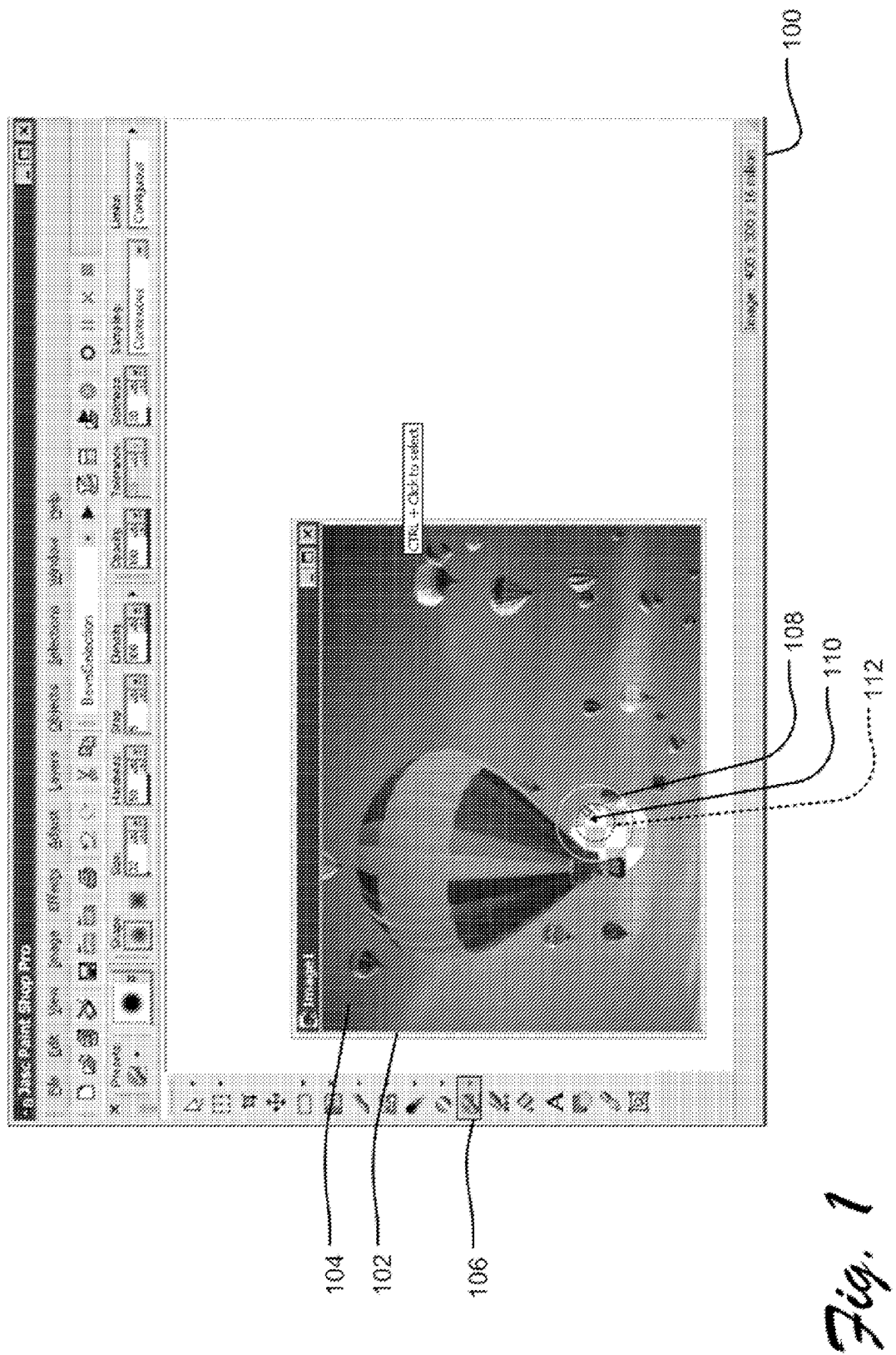
FIG. 1 illustrates a screenshot of a region editing tool employing an adaptive sampling region.

An exemplary adaptive region editing tool samples one or more properties (e.g., colors, texture) of pixels in a digital image within different subdivisions of an editing tool impression to produce different property distributions. Generally, an editing tool combines an image region designation, typically via a user interface, and an editing operation. In one implementation, the image region designation (e.g., a tool impression) can be automatically altered based on image region content within the region. Aon editing brush or wand represents an exemplary editing tool. The property distributions from each region are analyzed to identify different edit classes within the property space. The different edit classes are then used to apply an edit effect to the digital image within the tool impression (e.g., modifying hue property values of individual pixels, replacing one color with another, erasing pixels having a given color or being within a given color range, etc.). The edit classes may be represented by an edit profile in two or more dimensions (e.g., applying to one or more pixel properties).

Adaptive editing involves altering an editable property of a pixel and may include without limitation background erasure, red-eye correction, retouching, masking, surface normal processing, modifying image effects, blurring, sharpening, adjusting contrast, and labeling of image areas and features. In one implementation, the image region designation includes a sampling region centered within the tool impression, although in other implementations, the sampling region can be located anywhere within the image. Depending on image region content (e.g., if the image is uniform or nearly uniform within the sampling region), the sampling region can increase in size or alter in shape or location until the sampled image region content violates a specified sampling criterion. In this manner, the sampling region can expand or change to optimize the image content sampled in the region editing operation.

It should be understood that "uniformity" of pixel properties may have an absolute sense but may also be understood to have a relative sense in relation to the editing task the tool performs. For example, a threshold, range or limit defining the uniformity of the color variation in a sample region will be smaller when the task merely requires inclusion of block compression artifacts in the sample than when the task necessitates removal of shades of all red during red-eye correction. In turn, the permitted variability will, for example, be even larger when the task is the erasure of a strongly textured image background. As such, "uniformity" specifies a range of permitted variability, which may be relative to a given editing operation, image context, or user perception.

Furthermore, the uniformity of pixel properties in a sample may be described in any convenient way, for example using statistical descriptions. In an exemplary implementation, uniformity is defined as a ratio of variability within a pixel property distribution to a measure of central tendency of the distribution. Exemplary measures of central tendency include without limitation the mean, the median or the mode of the distribution. Examples of measures of variability may include without limitation standard deviations and variances of the distribution. An example of a preferred ratio describing uniformity is the coefficient of variation, which is the ratio of the standard deviation of the distribution to its mean.

It is common for a user to wish to erase a background of a digital image (e.g., to replace an original background with a different background). If the background is perfectly uniform (e.g., in a blue screen setting) and the foreground is sufficiently different, it is possible to discern which pixels in a given region are background and which are foreground using a zero-tolerance color similarity test. However, in another situation, a region may be "nearly uniform", in that it contains various pixel properties (e.g., colors) that are mathematically distinct but so visually similar that the region itself would still be treated by a user as a single type of region (e.g., the background). In yet another situation, a region may be significantly textured (e.g., a patterned background), but still be treated by a user as a single type of region.

In some circumstances, the sampling region of a tool impression may be modified during an editing operation according to image content, thereby providing improved results over existing methods. In one respect, this feature is related to the concept of Just Noticeable Difference (JND) between colors. It is possible to numerically define colors in a color space between which a user can perceive no difference because the numerical differences are smaller than the JND. The range of colors that appear identical to the user (i.e., that are just short of the JND) should be edited in the region, even if the colors differ numerically when expressed in some color space. Likewise, it is possible to define a range of colors and textures that user considers to be sufficiently similar that they represent features of a designated image region (e.g., a patterned background).

For example, a color distribution within a central sampling region can be sampled. Then, the central sampling region can be modified (e.g., grown, re-shaped, or relocated) to capture other pixels in the image region that exhibit a similar color property. Such sampling region adaptation can improve the ability of the editing tool to edit image features perceived by the user to be similar enough to receive the same editing treatment.

FIG. 1 illustrates a screenshot 100 of an exemplary region editing tool employing an adaptive sampling region. An image window 102 contains a view of a digital image 104. Selection of a background erasure tool button 106 initiates the exemplary region editing tool; Operation of the exemplary tool is characterized by display of a tool impression 108 around the tool symbol 110 in the illustrated implementation. In one implementation, the tool impression 108 defines the portions of the digital image 104 to be analyzed during a region editing operation. The tool impression 108 may also be manipulated by the user within the digital image display, such as by use of a keyboard, mouse, stylus, or other input device. Manipulation may include without limitation changes in location, size, shape, and orientation.

In FIG. 1, the tool impression 108 is illustrated as a circular region, although other shapes may be employed, including without limitation square regions, rectangular regions, and adjustable regions. The illustrated tool impression 108 defines two component regions: a sampling region 112, and an outer region between the sampling region 112 and the outer boundary of the tool impression 108. Furthermore, in various implementations, the dotted line boundary of the sampling region 112 may or may not be visible to the user. In alternative implementations, tool impression regions and component regions of other shapes and orientation may be employed, including rectangular regions, triangular regions, regions of different shapes, adjacent regions (as opposed to concentric), overlapping regions, and non-adjacent regions. In addition, more than two subdivision regions may be employed.

In the illustrated implementation, the sampling region 112 defines a region from which the region editing tool extracts pixel properties used in determining editing parameters. While the size, shape, location, and orientation of the sampling region may be held static during an editing operation, in alternative implementations, the characteristics of the sampling region may be adaptively altered during an editing operation. For example, given a sampling region of an initial size, the region can be grown to encompass additional pixels within the tool impression. In this manner, the image content sampled in the sampling region can be optimized toward a particular objective, as discussed below.

In one implementation, the sampling region may be dynamically sized based on the values of pixel properties found in the tool impression or in individual subdivisions of the tool impression. For example, the size of a round sampling region may be automatically set by incrementally increasing the radius of a round sampling region until the width of a color difference distribution of pixels in the sampling region increases beyond a given threshold width, which might suggest that the sampling region has grown to include a portion of the object's color. Other approaches for dynamically adapting the size, shape, location, and orientation of the component regions based on image content are also contemplated.

The individual subdivisions allow a user to provide intelligent guidance for the selection of how and whether an individual pixel is edited. For example, as discussed, a user may wish to erase the background of an image, leaving the human subject (i.e., the foreground object) unchanged. In the illustration of FIG. 1, the tool impression 108 is placed in the digital image 104 so as to erase the pixels comprising the sky while leaving the pixels comprising balloon and basket relatively unchanged. Accordingly, the user can communicate guidance for this selection to the tool by including in the sampling region 112 only pixels to be erased and including in the outer region some pixels of the object. Given this region-based information, the tool can then discern through classification which pixels to edit and how to edit them. This classification may be aided by the adaptive alteration of the sampling region 112.

Examples of editing may include without limitation modifying image-related pixel properties, such as color, transparency, etc., but may also include modifying existing non-image-related pixel properties or adding additional properties (e.g., labels or properties applied to certain areas of the digital image). Various pixel properties and color spaces may also be employed, singly or in combination, in other implementations, including CMYK, Lab, and other color space values, as well as transparency, brightness, hue, and saturation. Furthermore, non-image pixel properties are also suitable, including a membership associated with a pixel, a feature vector (e.g., a texture descriptor or a color histogram of an image region), a height map, a depth map in a scene, a displacement vector, etc.

It should also be understood that different color spaces may be used for the individual adaptive editing sub-operations, including determining component region characteristics, determining an edit profile, performing the edit, and generating display characteristics. For example, the edit profile may be based on color distributions in the regions while the editing operation may perform a "selective restoration" action in which a previously executed editing operation is selectively "undone" (e.g., by performing a generally opposite editing action) according to the edit profile. In this manner, aspects of the image region may be selectively restored to a previous state (i.e., by selectively undoing a previously executed fill operation).

In the illustrated implementation, the appearance of a pixel is characterized by at least four values: three color channel values (e.g., red, blue, and green or RGB) and an opacity (or conversely, transparency) channel value, which defines the opacity of the pixel. The color channel values may be combined in a variety of ways to represent a single color selected from a given color space. The opacity channel value represents a degree by which an object obscures another object beneath it. For example, an object with 100% opacity completely conceals an object beneath it. In contrast, an object with 0% opacity is completely transparent and allows an object beneath it to be totally unobscured. An object with an opacity value between 0% and 100% is partially transparent. Specifically, the opacity of an object is defined by the opacity of the individual pixels that comprise it. (In FIG. 1, the checkerboard pattern visible in the image represents a region of pixels exhibiting some level of transparency.)

Accordingly, the exemplary adaptive editing tool of FIG. 1 analyzes pixel properties within each of the component regions of its tool impression to determine pixel property distributions within each component region. For example, in the illustrated tool example, the colors of each pixel (or of some subset of individual pixels) within the sampling region 112 are identified. In addition, the colors of pixels within the outer region are sampled. From these pixel color samples, the editing tool computes pixel color distributions associated with each region. It should be understood that property distributions may be quantized to any chosen degree and may represent, without limitation, frequencies of pixels having given property values, an integration of such frequencies, or some other mathematical derivation of the property frequencies. In addition, in some implementations, property distributions may be represented by histograms or hierarchies.

Sampling a pixel generally refers to the process of reading a pixel property for the purpose of analysis or classification. Furthermore, a pixel property may include an overall image, object or region property that is associated with a given pixel [e.g., an object label]. Sampling may also be performed on all pixels in a given region or on a representative fraction of the pixels in the region, which may be considered sparse sampling.

Given the pixel property distributions of the multiple component regions in the tool impression, the tool determines edit classes in the pixel property space (e.g., the color space) to which an editing effect may be assigned. For example, edit classes may be specified as: (1) an Erasure Class—a class of colors to be completely erased; (2) a Partial Erasure Class—a class of colors to be partially erased; and (3) an Unchanged Class—a class of colors to be left unchanged. However, in alternative implementations, it should be understood that any number of classes and editing effects may be controlled by the edit profile.

In the illustrated example, each pixel within the tool impression 110 is classified into one or more defined edit classes based on the pixel property value associated with the pixel. In some implementations, the defined edit classes may model classified pixel property distributions within a tool impression or may be derived from such classified pixel property distributions (e.g., computed based on a mathematical transform of the distributions). IN one implementation, the editing effects are assigned to individual edit classes by way of an edit profile, as discussed with regard to FIG. 2. in alternative implementations, multiple editing effects may also be combined in more than one edit class (e.g., as a result of overlapping edit classes), or edit classes and membership therein may be determined by a probability function, so as to provide somewhat fuzzy or non-discrete edit class boundaries in the property space.

Accordingly, an edit profile may be used to apply one edit effect to one edit class of pixels within the image and a different edit effect to another edit class of pixels. In contrast, multiple edit effects for multiple edit classes are also contemplated. An edit effect may modify one pixel property of one edit class and the same or different pixel property of a second edit class. The pixel property being modified may be the same as or different from that used to segregate pixels into edit classes. The transition between different edit effects may be abrupt or gradual, with some pixels receiving an intermediate effect. Pixels receiving an intermediate effect may be of a separate edit class or may represent regions of overlap of class probability or class membership. The edit profile may determine an effect to be applied in absolute terms, for instance by prescribing a new value for a pixel property to replace the old, such that the new value (i.e., a replacement value) depends solely on the profile. The edit profile may also designate values of a new pixel property not previously associated with pixels within the image. Alternatively, the edit profile may represent a mathematical transformation between old and new property values of a pixel, such that the resulting image property depends both on the edit profile and on the original pixel property value. For instance, the edit profile may represent a scaling factor for an existing image property. More complex transformations are also contemplated wherein the new pixel property is expressed as a parameterized function of the original property with parameter values determined by the value of the edit profile.

In the illustrated example, erasure may be accomplished by setting the opacity channel values of pixels within the tool impression 110 having color values within the erasure class to 0% opacity, setting the opacity channel values of pixels within the tool impression 110 having color values within the partial erasure class to some value between 0% and 100%, and setting the opacity channel values of pixels within the tool impression 110 having color values within the unchanged class to 100% opacity. (in one implementation, the opacity channel value of each pixel is scaled, not merely set, between 0% and 100% original opacity of the pixel in accordance with the edit profile, in order to accommodate pixels already having a non-zero opacity.) Alternatively, transparency may be scaled by a scaling factor derived from the edit profile. Furthermore, the edit profile may set the allowable extremes of the editing effect to factors different than 0% and 100%. As previously noted, erasure is only one example of the type of editing that may be selectively performed using implementations described herein.

In an alternative implementation, no pixel is set to 0% opacity (or 100% transparency) during the editing operation. Instead, some pixels may be set to some low opacity level (e.g., 6%) or some high transparency level (e.g., 94%). However, as pixels exhibit such nearly complete erasure unnoticed by the user, they may be post-processed alter completion of the editing operation to exhibit complete erasure.

Figure 2:
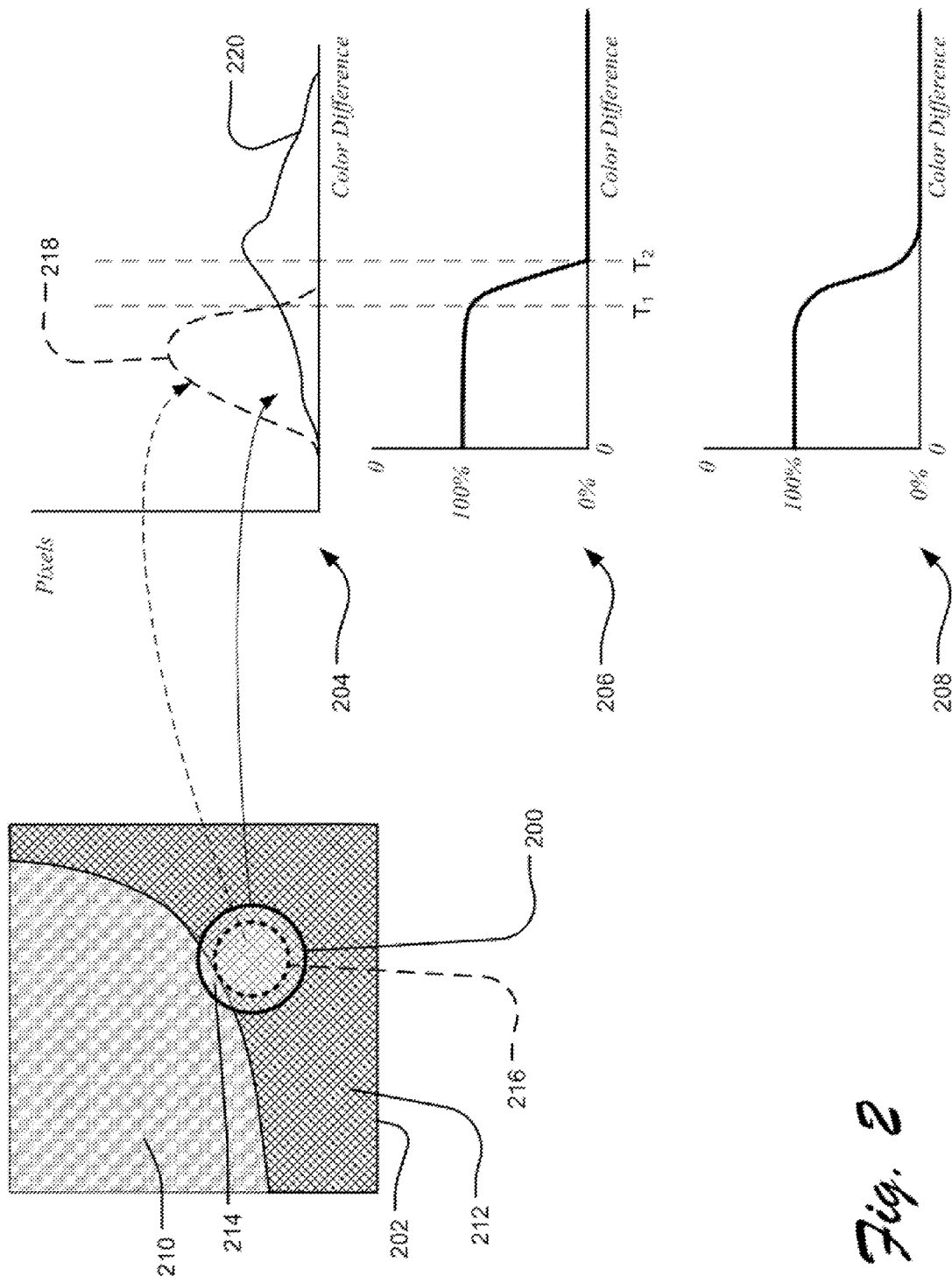
FIG. 2 illustrates exemplary relationships among a tool impression on a digital image, region property distributions, and two edit profiles.

FIG. 2 illustrates exemplary relationships among a tool impression 200 on a digital image 202, region property distributions 204, and two edit profiles 206 and 208. The digital image 202 includes an object 210 (representing a general class of pixels that are not to be edited) and a background 212 (representing a general class of pixels that are to be edited).

Both the object 210 and background 212 may include multiple colors, textures, opacity values, etc. The adaptive region editing tool evaluates the pixel properties within the tool impression 200 to determine how to edit the pixels therein. In one implementation, the user places the tool impression 200 such that the outer region includes pixels of the object 210 (see region portion 214) and the sampling region 216 includes pixels of the background 212 but substantially none of the pixels of the object 210 to guide the selective editing operation of the tool. In alternative implementations, the tool impression 200 need not include any portion of the object. For example, an adaptive retouch tool can selectively modify pixels corresponding to an edit class in the outer sampling region or selectively modify pixels corresponding to the edit class in the sampling region, in each case the pixels in the remaining edit class(es) being substantially unchanged.

The sampling region 216 is adapted according to the image content within the tool impression 200. In one implementation, this adaptation is an iterative process in which the pixels within the sampling region 216 are sampled, the sampling results are evaluated (e.g., compared to a sampling criterion), and if the sampling criterion is met, the sampling region 216 is grown and the processes restarts. When the criterion is violated, the size of the sampling region 216 returns to a smaller size that does meet the sampling criterion.

In an alternative implementation, only the pixels newly encompassed by the modified sampling region are sampled and compared to the original sampling region distribution. These pixels are said to lie within an "incremental modification region", which may also encompass new pixels by virtue of a shape change, a translation, a rotation, a hardness change, etc. for example, if the width of the pixel property distribution of the newly encompassed pixels exceeds the width of the pixel property distribution of the original sampling region by the sampling criterion, the growth of the region will stop and the region will revert back to a size that will not violate the sampling criterion.

When the adapted sample region size is achieved, the properties of pixels within the sampling region 216 are analyzed to produce a pixel property distribution 218, and the properties of pixels within the outer region are sampled to produce a pixel property distribution 220. In FIG. 2, the vertical axis of distributions 204 represents the number or fraction of pixels having a pixel property value. The sampled property values are likely to be distributed throughout each region. For example, if the pixel property is color (or a color difference), it is reasonable to expect that the various pixels might exhibit some distribution of color throughout each region.

It should be understood, however, that although this description of FIG. 2 relates to a single type of property (e.g., color) for each pixel, multiple properties may also be sampled to produce distributions of multiple properties for each pixel, such as values of multiple color channels, opacity, texture, etc. A given property, such as color, may have one or more dimensions. For example, color represented by an index into a color palette could be considered as one-dimensional because a single number—the palette index—is sufficient to define it. Alternatively, color defined by an RGB triplet of a pixel is three-dimensional, one dimension for each of red, green and blue. However, a pixel property may also be composite. For example, a given pixel may be associated with several numbers representing texture in some way and some values representing color. Therefore, a pixel property may represent at least: (1) a one-dimensional single property, (2) a multi-dimensional single property, or (3) a composite property.

In one implementation, a distribution of pixel properties of pixels in the sampling region is analyzed. An exemplary pixel property that may be employed in this analysis involves the color difference between the color of the pixel at the center of the sampling region 216 and the color of each other pixel in the sampling region 216. The background color CB (comprising of the color components RB, GB, and BB) is taken to be the color or the center pixel of the sampling region 216. The color CB may be used to establish the origin for the color difference axis and may be used for unblending pixels containing colors of both the object and the background. It should be understood that the color CB may also be computed using other algorithms, such as an average or median or mode color of pixels in the sampling region. (A vector median or mode returns some color that actually exists in the image.)

Differences in pixel properties, including multidimensional properties, may be computed in a variety of ways dictated by the nature of the intended editing operation. Distance Dist in p property space of dimension i may be expressed as a Minkowski sum or b norm:

$$Dist = \left[\sum_i (p_i - p_{i0})^b\right]^{1/b}$$

where $p_{i0}$ is a reference property value relative to which differences are computed. This reference property value may, for example, represent a background color. The exponent b may have a variety of integer or non-integer values (e.g., 1, 2, or 4). When b is 1, for a vector valued property $p_i$, such as color represented by R, G and B, Dist is equivalent to a simple sum:

$$Dist=(R-R_0)+(G-G_0)+(B-B_0)$$

For b=2, Dist is computed as the Euclidean distance:

$$Dist=\sqrt{(R-R_0)^2+(G-G_0)^2+(B-B_0)^2}$$

Distances may be computed with regard to sign, or using absolute values as in a Manhattan distance;

$$Dist=|R-R_0|+|G-G_0|+|B-B_0|$$

Distance calculations may also take into account property distributions (e.g., by means of a Mahalanobis distance). Furthermore, distances may be computed along individual property dimensions i, or subsets of these dimensions, and then combined into a single metric by mathematical transformation. For example, a minimum value may be selected:

$$Dist=MIN(|R-R_0|,|G-G_0|,|B-B_0|)$$

or a weighted combination value may be derived:

$$Dist=w_R(R-R_0)+w_G(G-G_0)+w_B(B-B_0)$$

wherein w, represents the weight for the contribution of a property or property dimension i. Additionally, one subset of property dimensions may be treated differently from another as in:

$$Dist=MAX(|R-R_0|,|G-G_0|)+|B-B_0|$$

Distances along individual dimensions may be combined into a single metric by rule, including the use of conditional rules as, for example, in:

$$Dist=MAX(|R-R_0|,|G-G_0|)+|B-B_0| \text{ if } Sign(R-R_0)$$
$$=Sign(G-G_0)\neq Sign(B-B_0)$$

$$Dist=MAX(|G-G_0|,|B-B_0|)+|R-R_0| \text{ if } Sign(G-G_0)$$
$$=Sign(B-B_0)\neq Sign(R-R_0)$$

$$\text{Dist} = \text{MAX}(|B-B_0|, |R-R_0|) + |G-G_0| \text{ if } \text{Sign}(B-B_0)$$
$$= \text{Sign}(R-R_0) \neq \text{Sign}(G-G_0)$$

Depending on editing needs, it may be advantageous to form a metric from only a subset of pixel properties or only from a subset of pixel property dimensions. In one implementation pertaining to a prototypical vector p, in a property space of dimension i; 4, a distance may be expressed for example as:

$$\text{Dist} = [(p_1-p_{10})^b + (p_3-p_{30})^b + (p_4-p_{40})^b]^{1/b}$$

Properties may also be transformed from one representation to another before computing a distance. For example, a color vector may be transformed to an opponent color representation such as L*a*b* or into an approximately opponent representation such as:

$$RGB = (R+G+B)/3$$

$$RG = (R-G+256)/2$$

$$BY = (2b-R-G+512)/4$$

After such a transformation either all or some of the properties or property components may be used to compute a property difference. For example, an approximately lightness-independent color difference may be estimated using:

$$\text{Dist} = |RG-RG_0| + |BY-BY_0|$$

or:

$$\text{Dist} = \sqrt{(RG-RG_0)^2 + (BY-BY_0)^2}$$

It should be understood that when a distance is estimated for a composite pixel property, such as combination of color and texture, the form of the metric for each component property may be chosen independently and the metrics may be combined with different weights or by independent rules.

When using multidimensional property spaces, especially spaces of high dimension, it may be beneficial to include dimensionality reduction in the estimation of a distance in property space. Such dimensionality reduction may, for example, be achieved by employing only the leading or leading few principal components of the space. Alternatively, discriminant axes may be determined by a method such as linear or Fisher discriminant analysis. It is also possible to use principal component analysis in combination with discriminant analysis to discard insignificant property component vectors and then select a most discriminating vector from the remaining components. in yet another implementation, distributions may be fitted using mixture models, which may then be used to classify properties of the image.

A result of the described sampling operation in the sampling region is a pixel property distribution, such as is represented by distribution 218. Likewise, the outer region is also sampled to produce an outer region pixel property distribution 220. Other methods of determining pixel property distributions (egg, color difference distributions) may be employed.

For an exemplary classification used in an adaptive background eraser, a three-dimensional color space has been converted into one-dimensional distance measurements. However, it is also possible to achieve this dimensionality reduction in other ways. First, dimensionality may be reduced by using only the leading principal components of the pixel colors under the tool impression. Secondly, one or more discriminant axes may be selected using, for example, linear discriminant analysis. The Principal Component Analysis step and the Linear Discriminant Analysis step can also be combined.

As seen in distributions 204, the distributions associated with the two regions (i.e., the sampling region 216 and the outer region of the tool impression 200) overlap considerably. in the illustrated example, this is to be expected in that the outer region includes a large area that contains background pixels. However, other distribution combinations are also possible, including combinations in which the sampling and outer region do not overlap, combinations in which multiple modes exist (whether the distributions overlap or not), etc. A variety of distributions are shown in examples in later Figures.

Accordingly, a feature of the exemplary tool is to take advantage of the user's placement of the tool impression regions to discern an edit profile based on the property distributions within the two differently located regions. in one implementation, it is assumed that the property distribution of pixels in the sampling region 216 represents the properties that are to be edited. it is also assumed that the property distribution of pixels in the outer region includes some properties that are not to be edited. These two assumptions facilitate the classification of properties values into distinct edit classes. It should be understood, however, that the editing may be in the inverse sense.

in one implementation, the edit profile is determined through classification of the property distributions to identify properties in different edit classes. in an example of an adaptive background erasure tool, Alpha (or "transparency") values may be derived according to a measure of similarity between the color of a pixel under the brush and an estimate of the background color under the brush. In one implementation, pixels having colors that are very similar are fully erased (set to 100% transparency), whereas pixels having colors that are very different are not erased (no change to the transparency of the pixels). Intermediate color differences result in a partial erasure by changing the transparency of a pixel to some intermediate Alpha value—the greater the color difference, the greater the change in the intermediate Alpha value, in another implementation, no pixels are completely erased, although complete erasure may be achieved at a later time through post processing.

As shown in the edit profile 206, the pixel property range from the origin to parameter $T_1$ represents a first edit class (in this example, generally representing the background), the range between parameter $T_1$ and parameter $T_2$ represents a second edit class (in this example, generally representing a probable mix of background and object), and the range greater than parameter $T_2$ represents a third edit class (in this example, generally representing the object).

In computing the example of edit profile 206, parameters characterizing the two pixel property distributions are computed. in one implementation, the mean color difference of the background distribution, $\text{Mean}_B$, and the variance of the background distribution, $\text{Var}_B$, are computed for determining the minimum tolerance parameter $T_1$. When $\text{Var}_B/\text{Mean}_B$, exceeds a threshold $\text{Thresh}_B$, $T_1$ may be computed as:

$$T_1 = k \times \sqrt{\text{Var}_B}$$

where k is a constant inversely proportional to the Sharpness setting. If threshold $\text{Thresh}_B$ is not exceeded, the sampling region may be iteratively expanded by a one-pixel wide contour about its periphery until this threshold is reached. Then $T_1$ may be estimated as before or as:

$$T_1 k \times \text{Integ}$$

where Integ is the color difference at a fixed traction of the integral of the difference distribution, such as 90% for instance.

Once the minimum tolerance parameter $T_1$ is computed based on the pixel property distribution in the sampling region 216 of the tool impression 200, the pixel properties under the outer region of the tool impression 200 are analyzed to determine the maximum tolerance parameter $T_2$. The pixels within this region are characterized by an unknown combination of pixel properties (e.g., of object and background colors). The pixel property distribution 220 for this region is filtered to exclude all pixels having pixel properties below the minimum tolerance parameter $T_1$. In one implementation, the mean color difference of the object distribution, $Mean_o$, and the variance of the object distribution, $Var_o$, are computed for determining the maximum tolerance parameter $T_2$. Up to a predefined magnitude of k, $T_2$ may be taken as:

$$T_2 = k \times MIN(Mean_o, \sqrt{Var_o})$$

and above this magnitude as:

$$T_2 = k \times \sqrt{Var_o}$$

If $Var_B/Mean_B$ is less than the threshold $Thresh_B$, the value of $T_2$ may be adjusted as follows:

$$T_2 = T_1 + T_2$$

Additionally, when $Var_o/Mean_o$ is less than a threshold, $Thresh_o$, but $\sqrt{Var_o}$ exceeds a second threshold, $ThreshV_0$, the same adjustment may be performed. In general, $T_1$, and $T_2$ are constrained to represent non-null color difference ranges and to lie within their respective data ranges, and the value of $T_1$ is further constrained to be less than that of $T_2$.

Other types of classification may be employed to define editing classes. For example, more conservative values of thresholds may be used, i.e. a minimum tolerance $T_1$ and a maximum tolerance $T_2$ to define edit classes of colors that have a very high probability of belonging to the background and the object respectively. These two conservative edit classes may be used as training sets for a classifier that categorizes the remaining colors.

Alternatively, any of several probability density functions may be fitted to the pixel property distribution of the sampling region. By subtraction of the extrapolated distribution of the color differences in the outer region of the brush, a better estimate of true object colors may be obtained to act as a training set. Suitable exemplary trial distributions include without limitation the normal, binomial, Poisson, gamma and Weibull distributions. Additional exemplary distributions may be found in the Probability distribution section of Wikipedia (http://eiiwikipedia.org/wiki/Probability_distribution). Such distributions may also be used for classification using Bayesian statistics. Because of the projection of color differences onto a single axis, several distinct colors may have color differences falling in a single histogram bin. The original colors contributing to each bin can be identified in the three-dimensional color space and the training set member colors can be used for a classification of colors in three-dimensional space.

Exemplary methods for suitable for this classification are described in T.-S. Lim, W.-Y. Loh and Y.-S. Shih, "A Comparison of Prediction Accuracy, Complexity, and Training Time of Thirty-three Old and New Classification Algorithms", Machine Learning Journal, vol. 40, p. 203-229, 2000, and include categories such as decision tree approaches, rule-based classifiers, belief networks, neural networks, fuzzy & neuro-fuzzy systems, genetic algorithms, statistical classifiers, artificial intelligence systems and nearest neighbor methods. These techniques may employ methodologies such as principal component analysis, support vector machines, discriminant analysis, clustering, vector quantization, self-organizing networks and the like.

As an alternative to this form of classification, the color distributions of the sampling region and the outer region may be treated as two signals to be separated into background and object categories by the techniques of blind signal separation, Since the sampling region provides a background signal not significantly contaminated by object colors, this represents a more straightforward case of semi-blind signal recovery. An element of blind signal separation is the use of higher order statistical measures. Suitable methods for blind signal separation are described in J.-F. Cardoso, "Blind signal separation, statistical principles", Proc, IEEE, vol. 9 (10), p. 2009-2025, 1998 and in A. Mansour, A. K. Barros and N. Ohnishi, "Blind Separation of Sources: Methods, Assumptions and Applications", IEICE Trans. Fundamentals, vol. E83-A, p. 1498-1512, 2000.

The edit profile relates an editing effect, designated 0, to the different edit classes. For example, in an erasure operation, the editing effect may represent a transparency value (i.e., the inverse of opacity). As such, edit profile 206 specifies a nearly 100% transparency value for the edit class between 0 and parameter T1, representing complete erasure of pixels having colors falling in this range. For example, the transparency may range from about 99% at a color difference of zero to about 92% at parameter $T_1$. In contrast, the edit profile specifies an unchanged transparency value for the edit class greater than parameter $T_2$, representing no change to the pixels having colors falling in this range. For pixels having colors falling between parameter $T_1$, and parameter $T_2$, edit profile 206 specifies a roughly linear sealing of the transparency effect (e.g., transparency change decreases with increasing color differences).

It should also be understood that although the edit profiles of FIG. 2 are shown to be based on a single pixel property distribution, edit profiles may also be generated for multiple pixel properties and therefore are not limited to two dimensions.

In alternative implementations, an edit profile need not be based on sharp thresholds, as shown by the sigmoidal edit profile 208, where a parameter can define a point of inflection or any other feature of an edit profile based on a pixel property. For example, the parameters $T_1$ and $T_2$ may be employed to define an edit profile that defines an Alpha value (i.e., defining transparency of a pixel) based on the tilde function:

$$Alpha = 1 - \exp\{-T_1[1 n(DIFF_{max}/DIFF)]^{T_2}\}$$

Where DIFF represents the color difference of a pixel under the tool impression, $DIFF_{max}$, represents the maximum DIFF value of all pixels under the tool impression, and $T_1$ and $T_2$ are the parameters.

Sigmoidal functions may also be used, including without limitation the are tangent and the tangent functions, and an adaptation of the Weibull function, with the form:

$$Alpha = 1 - \exp[-(T_2/DIFF)^{T_1}]$$

Other exemplary sigmoidal functions that may be adapted to define edit profiles are listed below:

$$Alpha = 1 - \left(\frac{2}{(1+e^{-(\frac{DIFF}{S})})} - 1\right) = \frac{2e^{-(\frac{DIFF}{S})}}{(1+e^{-(\frac{DIFF}{S})})}$$

$$\text{Alpha} = 1 - \frac{S \times DIFF}{\sqrt{1 + S^2 DIFF^2}}$$

The parameter S defining these functions may be, for example, derived by centering the point of inflection between the parameters $T_1$ and $T_2$ and matching the slope of the line between the parameters $T_1$ and $T_2$. In an alternative implementation, one or more thresholds are omitted from definition of the edit profile. Instead, the edit profile is defined by inflection points, decay constants, or other functional parameters. In this manner, the editing operation may be tuned to more effectively implement the user's desired editing effect. The methods of defining these functional parameters may be similar to those used in defining the thresholds discussed above.

Figure 3:
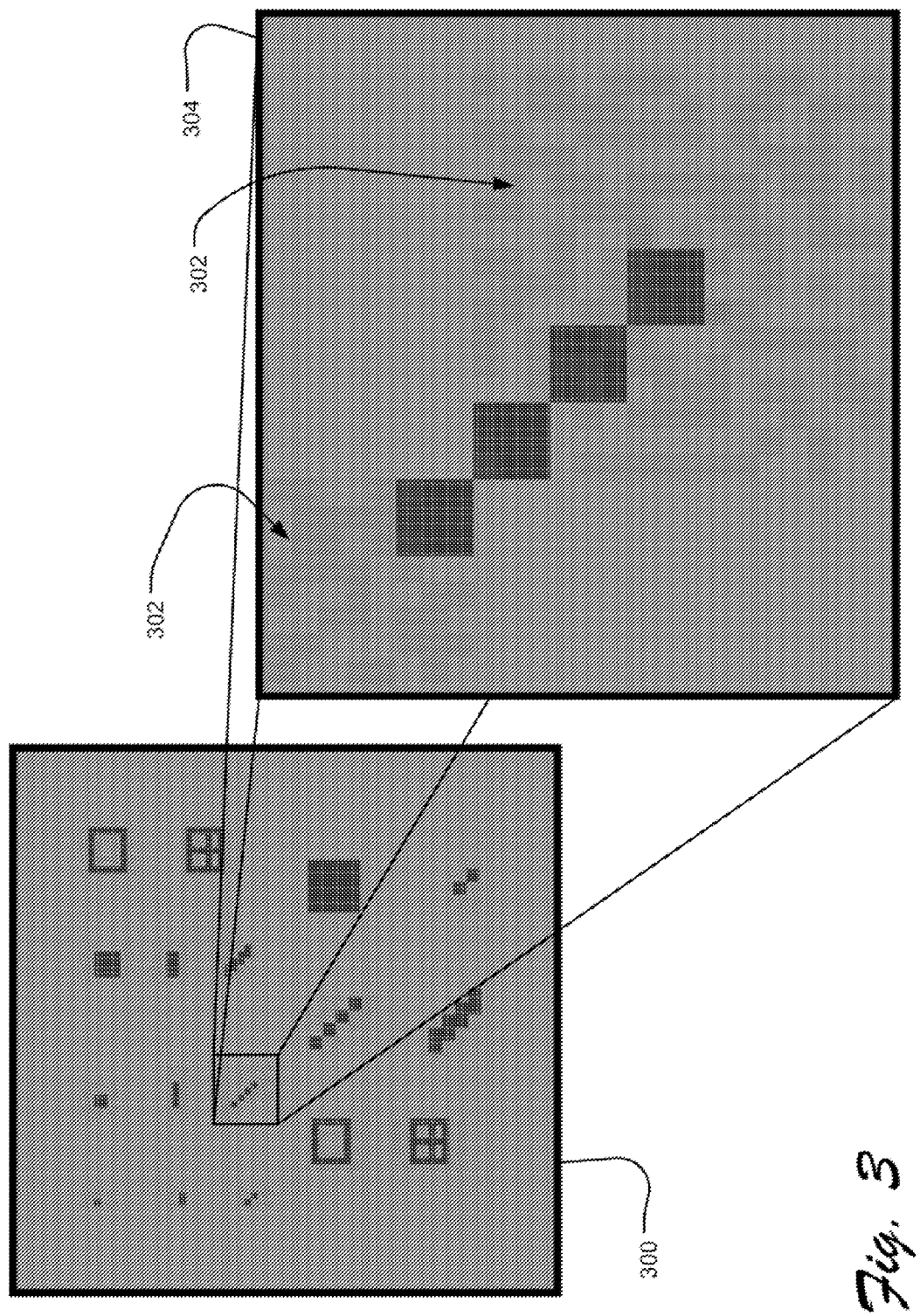
FIG. 3 illustrates block encoding artifacts in a digital image.

FIG. 3 illustrates exemplary artifacts in a digital image 300. The artifacts 302 in FIG. 3 are the result of block encoding in a lossy compression operation (e.g., JPEG encoding). The artifacts 302 are more apparent in the exploded view 304. From the view 304 of digital image 300, the artifact regions would likely be treated by a user as part of the background to be erased, even though the artifact regions 302 include colors that are mathematically different than the chosen background color.

Figure 4:
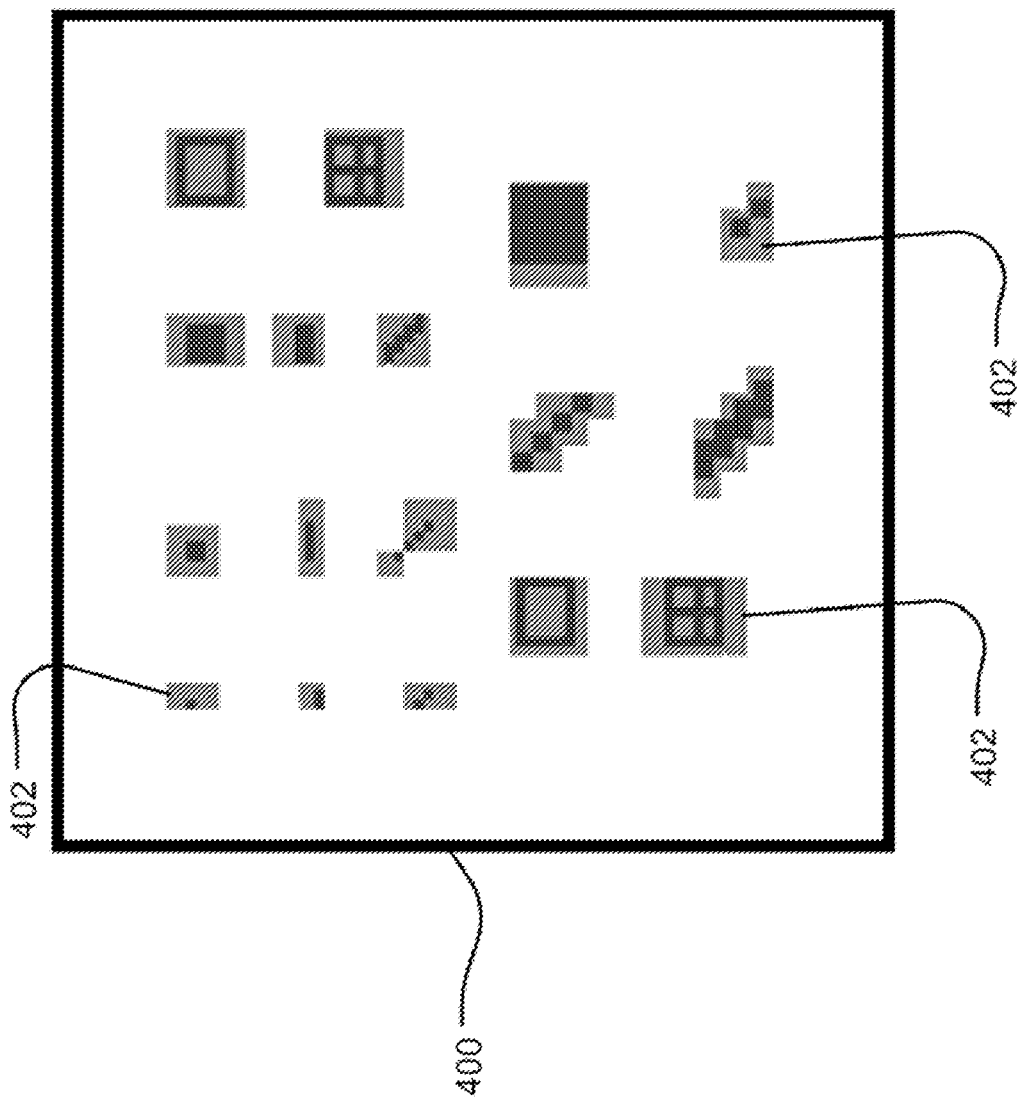
FIG. 4 illustrates an exemplary erasure of a background of a digital image using a perfect uniformity criterion.

However, as shown below, such artifacts can corrupt the results of some editing methods. A result of a zero tolerance editing method based on color similarity with a single sampled edit color is shown in a digital image 400 of FIG. 4. in the implementation shown in FIG. 4, the editing operation is a color replacement operation in which the sampled color is replaced with white. If a pixel's color does not equal the edit color, the pixel is not edited. As such, this method will not edit a pixel containing an artifact because the pixel color is not exactly the same color as the edit color. Accordingly, the non-uniform pixels of the background are not edited.

Figure 5:
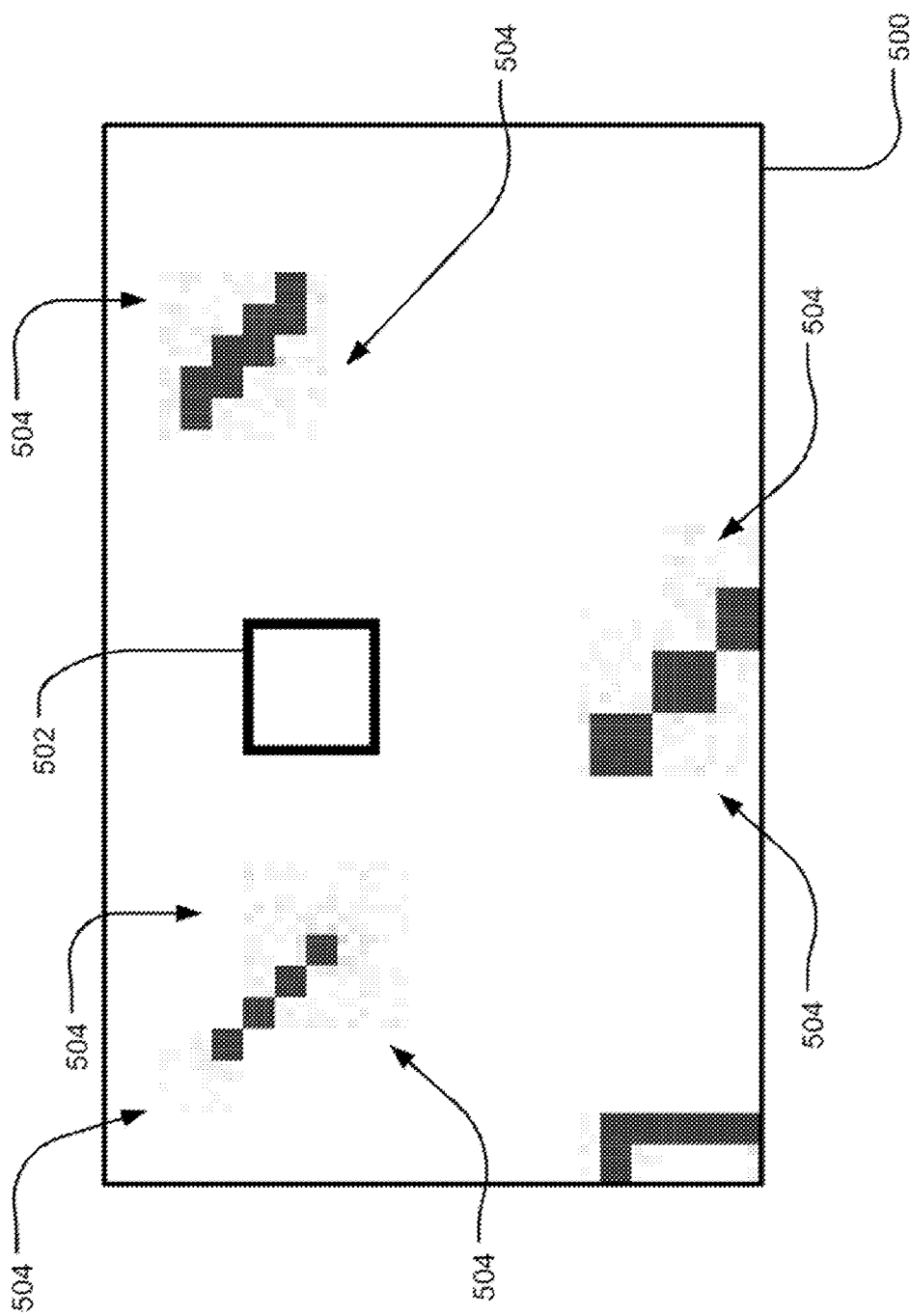
FIG. 5 illustrates an exemplary erasure of a background of a digital image using a near-uniformity criterion and a static-sized sampling region.

Digital image view 500 of FIG. 5 shows the result of an adaptive editing operation on the original digital image 300 of FIG. 3 using a non-optimized sampling region 502 and an edit profile generated therefrom. In the illustrated implementation, the fixed square sampling region 502 of 12 by 12 pixels is located within a tool impression (not shown) and is specifically positioned to encompass only the uniform grey background shown in FIG. 3. (in FIG. 5, the location of the sampling region 502 is shown relative to the digital image after the editing operation has been completed.)

The color differences under the sampling region 502 are calculated and compared to a preset color difference threshold. However, as shown, the sampling region 502 encompasses only a uniform grey region and does not encompass any of the artifact regions 504. Therefore, the edit profile is set according to the grey region only. For example, in FIG. 5, the threshold for complete erasing is set to a color difference of 1, by virtue of the complete uniformity of the sampled pixels. As such, the editing operation fails to adequately remove certain colors in the artifact regions in the background. Accordingly, although the adaptive erasure operation may have improved the erasure results over that of FIG. 4, the results are still unacceptable.

Figure 6:
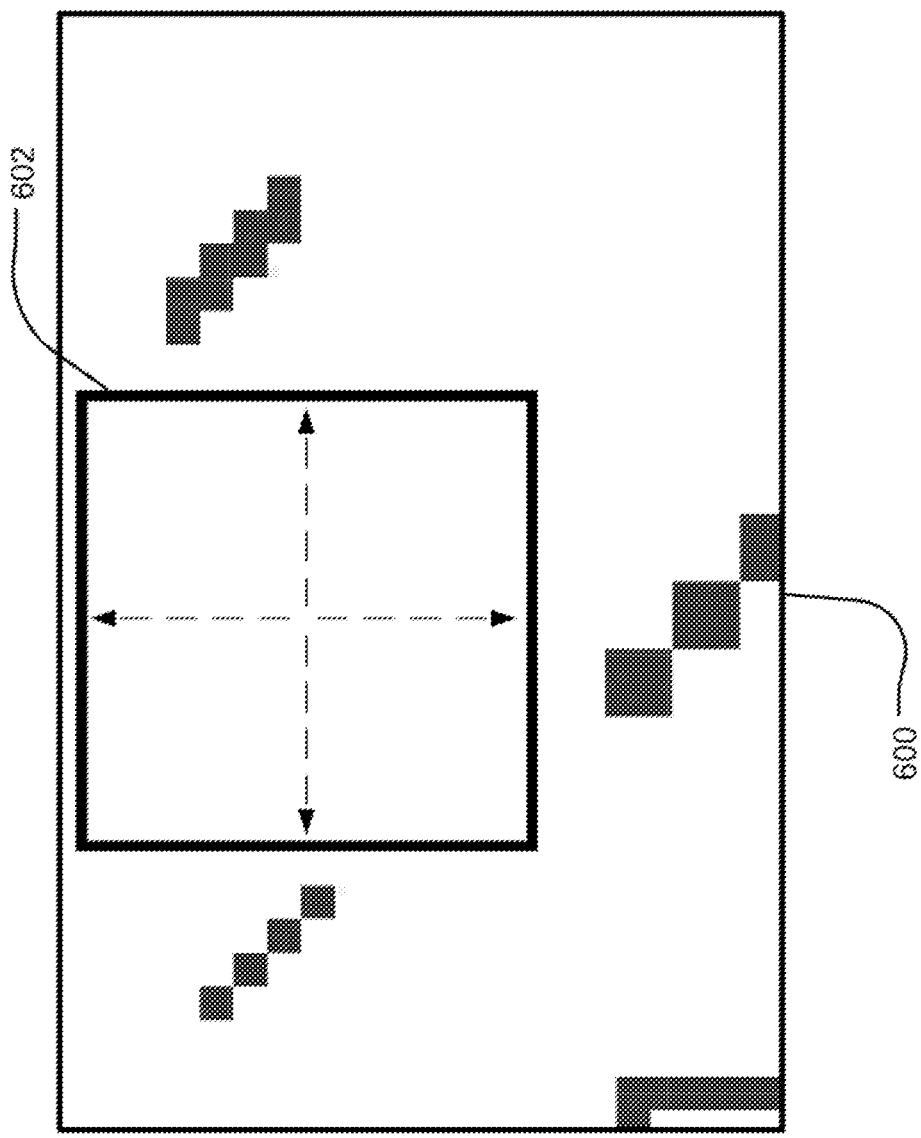
FIG. 6 illustrates an exemplary erasure of a background of a digital image using a near-uniformity criterion and an adaptively-sized sampling region.

Digital image view 600 of FIG. 6 shows the result of an adaptive editing operation on the original digital image 300 of FIG. 3 using an adaptive sampling region 602 and an edit profile generated therefrom. A difference between the sampling region 502 of FIG. 5 and the sampling region 602 is that is that the size of the sampling region 602 has been increased to the point that portions of the artifact regions have been encompassed by the sampling region 602. The resulting size of the sampling region 602 is 40 by 40 pixels. The increase is the result of an adaptation performed by the editing tool, in which the sampling region 602 is increased until the uniformity of the sampled pixels degrades to a given threshold by virtue of encountering the object or otherwise encountering sufficiently differently colored pixels.

Because the optimized sampling region 602 expanded to encompass portions of the artifact regions, the sampled pixel property distribution within the sampling region 602 reflects the contribution of the artifact pixels. As such, the resulting edit profile is adapted to edit a large number of the artifact pixels. By comparison to FIG. 5, a threshold (or some other functional parameter) for complete erasing is set in FIGS. 6 to 17 by virtue of the contribution of the artifact pixels encompassed by the larger sampling region. By comparing the views in FIGS. 5 and 6, it is clear that the adapted edit profile more accurately edits the pixels that the user would consider nearly uniform and part of the background.

Figure 7:
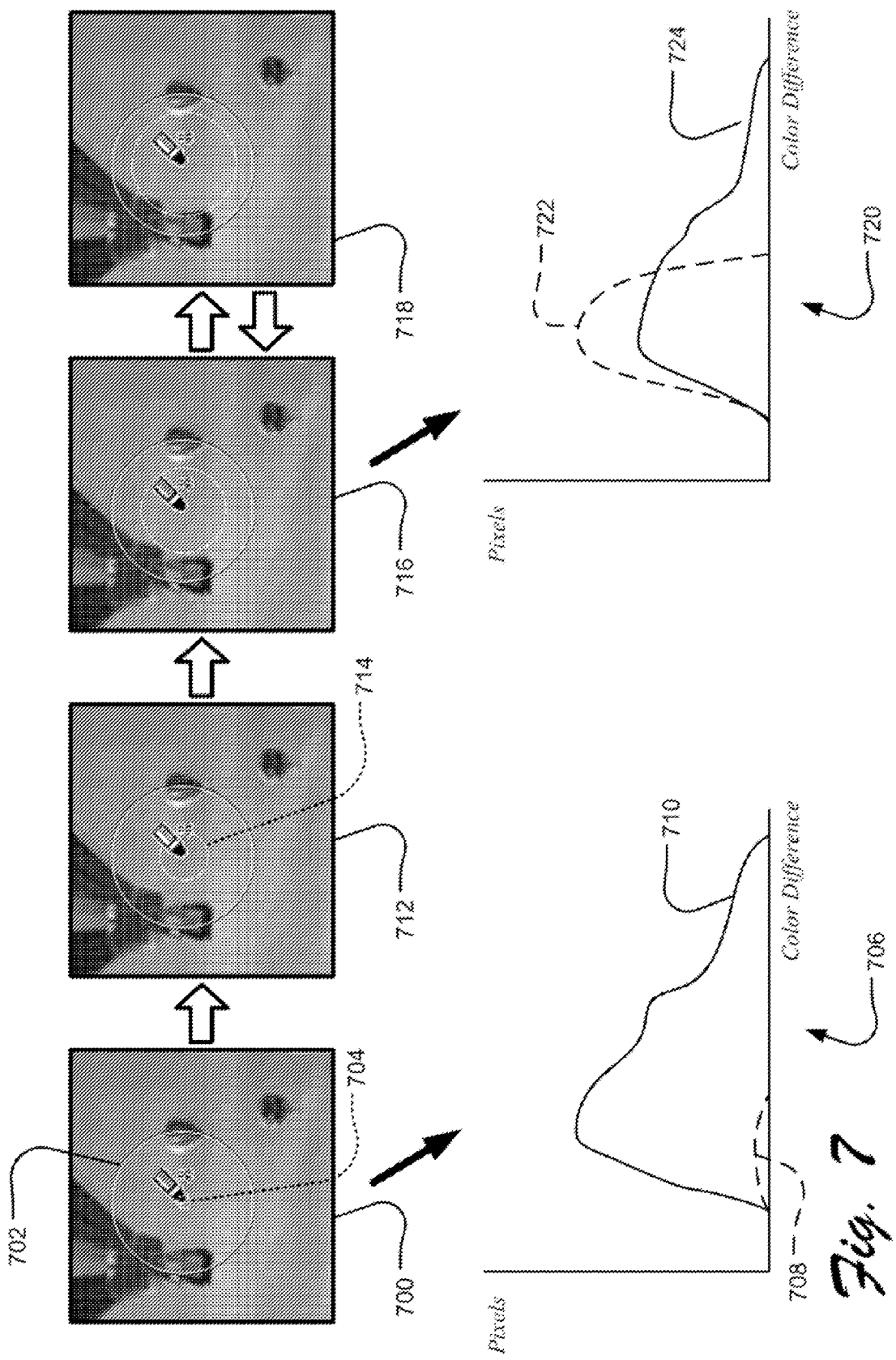
FIG. 7 illustrates an iterative process for adapting a sampling region in an exemplary region editing tool.

FIG. 7 illustrates an iterative process for adapting a sampling region in an exemplary region editing tool. A digital image region 700 includes several foreground objects (i.e., the balloons), which represent a general class of pixels that are not to be edited, and a background (i.e. the sky, which represents a general class of pixels that are to be edited. Both the foreground objects and the background may include multiple colors, textures, opacity values, etc. However, in the illustrated implementation, the background possesses a uniform or substantially uniform color distribution, which allows the adaptive region editing tool to adapt the sampling region in order to optimize the edit classification operation.

In one implementation, the user places a tool impression 702 such that a outer tool impression region includes pixels of the foreground objects and a central sampling region 704 includes pixels of the background, but substantially none of the pixels of the foreground objects, in order to guide the selective editing operation of the tool. A distribution graph 706 depicts an exemplary pixel property distribution 708 associated with the set of pixels encompassed by the sampling region 704 and an exemplary pixel property distribution 710 associated with the set of pixels residing in the outer region, between the periphery of the sampling region 704 and the periphery of the tool impression 702. Note that the portion of the outer region distribution 710 that overlaps the distribution 708 of the sampling region overwhelms the distribution 708.

Based on the sample taken from the central sampling region 704, the tool determines that the sampled background region is sufficiently uniform to warrant adaptation of the sampling region. To determine sufficient uniformity of a sampling region in one implementation, the tool computes the mean color difference of the background distribution, $\text{Mean}_B$, and the variance of the background distribution, $\text{Var}_B$. If the ratio of $$\frac{Var_B}{Mean_B} \leq T_{Uniform}$$

where $T_{Uniform}$ represents a threshold of sufficient uniformity (e.g., 2.5 in one implementation), then the sampling region is deemed sufficiently uniform for adaptation. The $T_{Uniform}$ parameter may be hard-coded into the tool, derived from analysis of exemplary image databases, software-settable (e.g., based on image content analysis) by some other means or user-settable, depending on the desired features of the tool.

Having deemed the sampling region to be sufficiently uniform for adaptation, the tool modifies the sampling region by altering the size, shape, location and/or orientation of the sampling region. in the digital image region 712, the sampling region is shown to have grown uniformly (e.g., the radius about the center of the circular sample region 704 has increased) to produce a modified sampling region 714. The modified sampling region is sampled and evaluated relative to a threshold of sufficient uniformity (such as $T_{Uniform}$ or some other parameter). While the modified sampling region is deemed to be sufficiently uniform, the sampling region is re-modified, re-sampled, and re-tested in incremental stages, as shown in digital image regions 716 and 718. However, when the uniformity of the incrementally modified sampling region falls below the applicable threshold of sufficient uniformity, as shown in digital image region 718 (i.e., the sampling region overlaps pixels of the foreground objects), the modified sample region reverts to a previous sample region having sufficient uniformity, as shown in digital image region 716.

As previously discussed, the comparison to the sampling criterion may be based on pixels within the sampling region or on some combination of the original sampling region and the pixels that are newly encompassed by the modified sampling region. Other comparisons are also contemplated, such that the editing tool is able to discern whether the new configuration of its sampling region has violated a sampling criterion, wherein the sampling criterion is set to optimally apply editing effects to pixels perceived by the user to be essentially in the same type of region.

Accordingly, the sampling has been enhanced to include additional pixels having sufficiently similar pixel properties to have captured a more accurate sample of the set of pixels to be edited (e.g., the background pixels). Likewise, the outer region sample contains fewer pixels sharing similar pixel properties with pixels that are to be edited. Therefore, as is shown by the pixel property distribution graph 720, a result of the sampling region adaptation is that the uniform sampling region (e.g., "background") distribution 722 is amplified and broadened slightly, and the overlapping portion of the outer region distribution 724 is reduced. Given this modified distribution set, classification of pixels to be edited, pixels to be partially edited, and pixels not to be edited may be altered to more accurately apply the editing effect to those pixels perceived by the user to be essentially in the same type of region.

Figure 12:
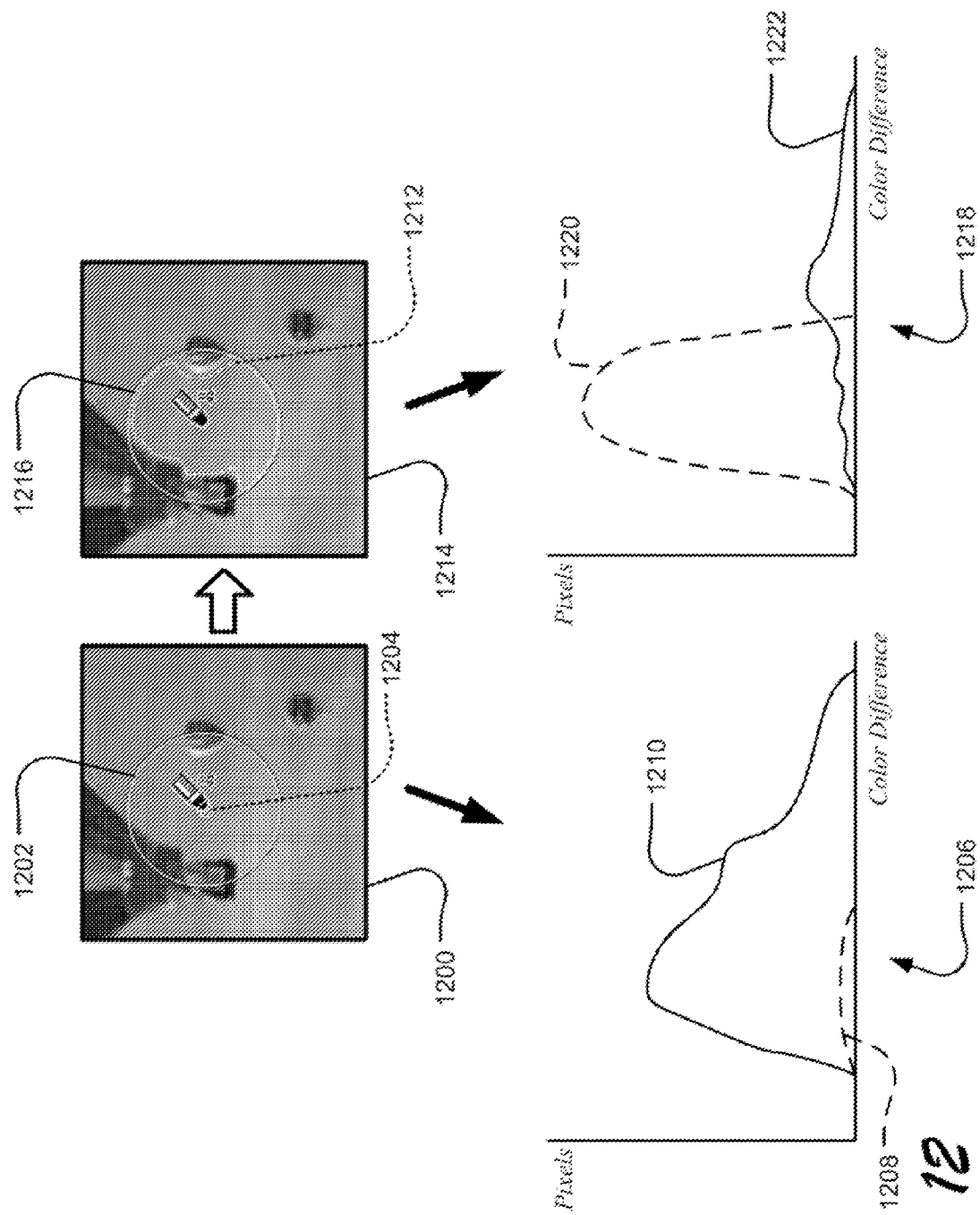
FIG. 12 illustrates a different exemplary modification of sampling region.

As shown in FIG. 7, one implementation modifies the sampling region by uniformly increasing the area of the sampling region (e.g., uniformly increasing the radius of a circular sampling region about the center of the region, increasing the side lengths of a square sampling region about the center of the region, etc.). The incremental increases may be of any viable magnitude, such as increasing the sampling region periphery pixel-by-pixel or by multiple pixels. However, non-uniform modifications are also contemplated as shown in FIG. 12.

Figure 8:
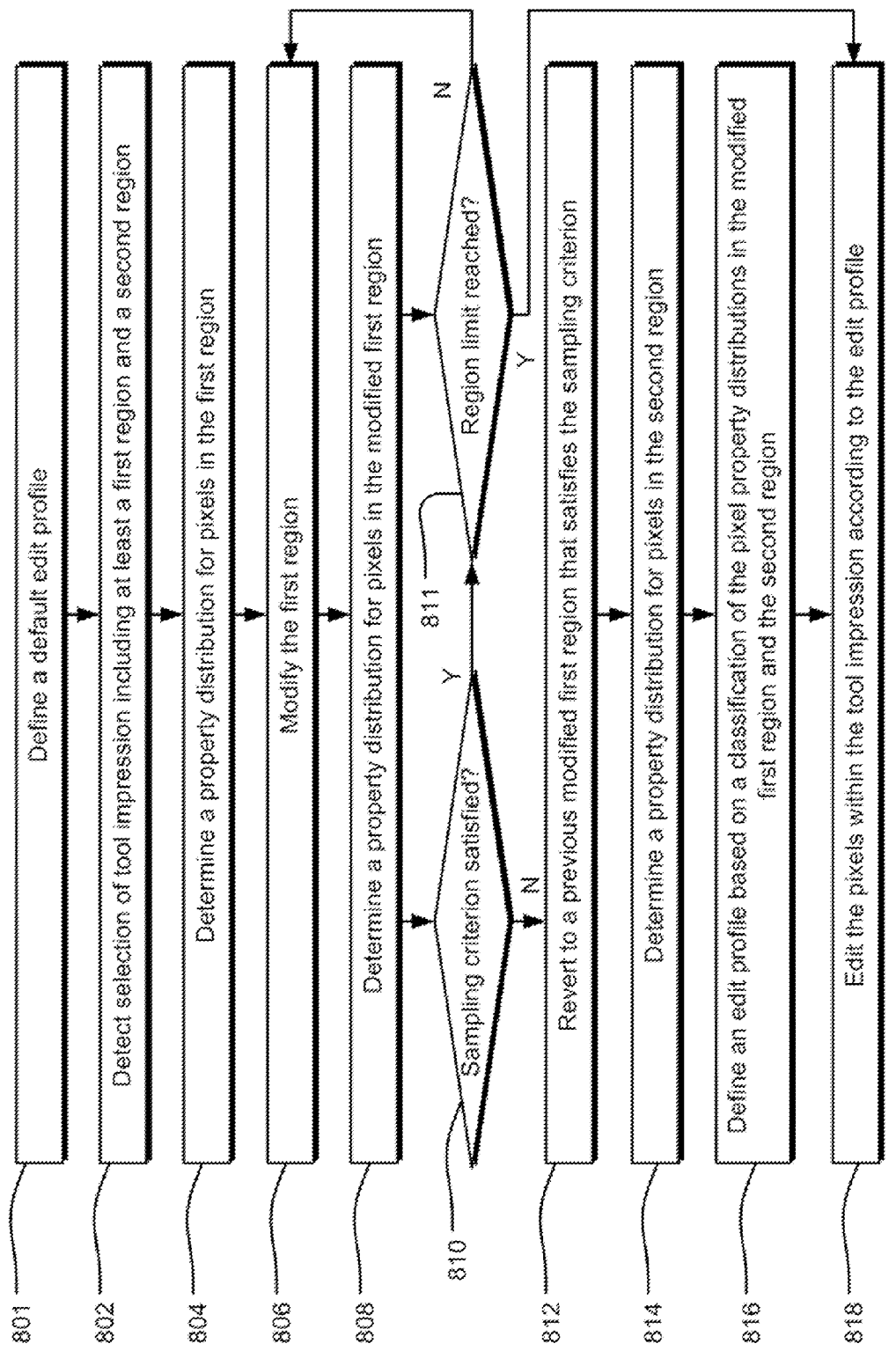
FIG. 8 illustrates exemplary operations for region editing using an adaptive sampling region.

FIG. 8 illustrates exemplary operations for region editing using an adaptive sampling region. A definition operation 801 determines a default edit profile, which may be applied if the definition operation 816 is not executed. A detection operation 802 detects selection of a tool impression relative to a digital image. The selection defines at least a first region (e.g., a central sampling region within the tool impression) and a second region (e.g., an outer region within the tool impression) within the tool impression. It should also be understood that FIG. 8 generally describes sequential processing for an individual tool impression, but that the same sequence of operations may be applied after selection of multiple tool impressions, such that an aggregate tool impression with an aggregate first region and an aggregate second region are processed. In addition, the sampling region is not limited to being "central" or "circular", but may have a variety of shapes and locations.

A sampling operation 804 determines a property distribution for pixels within the first region. For example, for each pixel, a color difference value (e.g., relative to a reference color value) may be used as the pixel property, although other properties may be employed. An adaptive operation 806 modifies the first region (e.g., its shape, size, location, orientation, hardness, etc.). A second sampling operation 808 determines a property distribution for all pixels within the modified first region (or for those pixels newly encompassed by the modified first region). If the property distribution of these pixels is deemed to be to violate the sampling criterion, as determined by decision operation 810, the modified first region reverts back to a modified first region that satisfies the sampling criterion, in reversion operation 812.

In contrast, if the decision operation 810 determines that the property distribution of the pixels satisfies the sampling criterion, another decision operation 811 determines whether the modified search region has reached a predefined limit of growth. In one implementation, this limit is the size of the tool impression, although other limits are definable as well. If the limit has been met; it means that the pixel properties of the entire tool impression satisfy the sampling criterion. For example, this can occur if the tool impression does not include any portion of the object. in such case, the tool may not have a second region to consider. As such, the processing merely proceeds to an editing operation 818 and edits the pixels within the tool impression in accordance with the default edit profile set in operation 801.

If the predefined limit of growth has not yet been satisfied, the processing loops back to the adaptive operation 806. As discussed with regard to FIG. 7, in one implementation, uniformity characteristics of the distribution of the first region are compared to a uniformity threshold, although alternative sampling criteria are also contemplated.

Resuming the case where the sampling criterion has been violated, another sampling operation 814 determines a property distribution for pixels within the second region (which may or may not have been modified from the original second region by modification of the first region). A classification operation 816 defines an edit profile based on the pixel property distributions within the first and second regions.

The edit profile specifies the editing effects to be applied to pixels having properties in a given edit class. Accordingly, an editing operation 818 edits the pixels within the tool impression in accordance with the edit profile. For example, pixels in the erasure region may have their transparency values set to 100% (or to some high transparency value) while pixels in the partial erasure region may have their transparency values set to some value between 100% and 0% in accordance with the edit profile.

Figure 9:
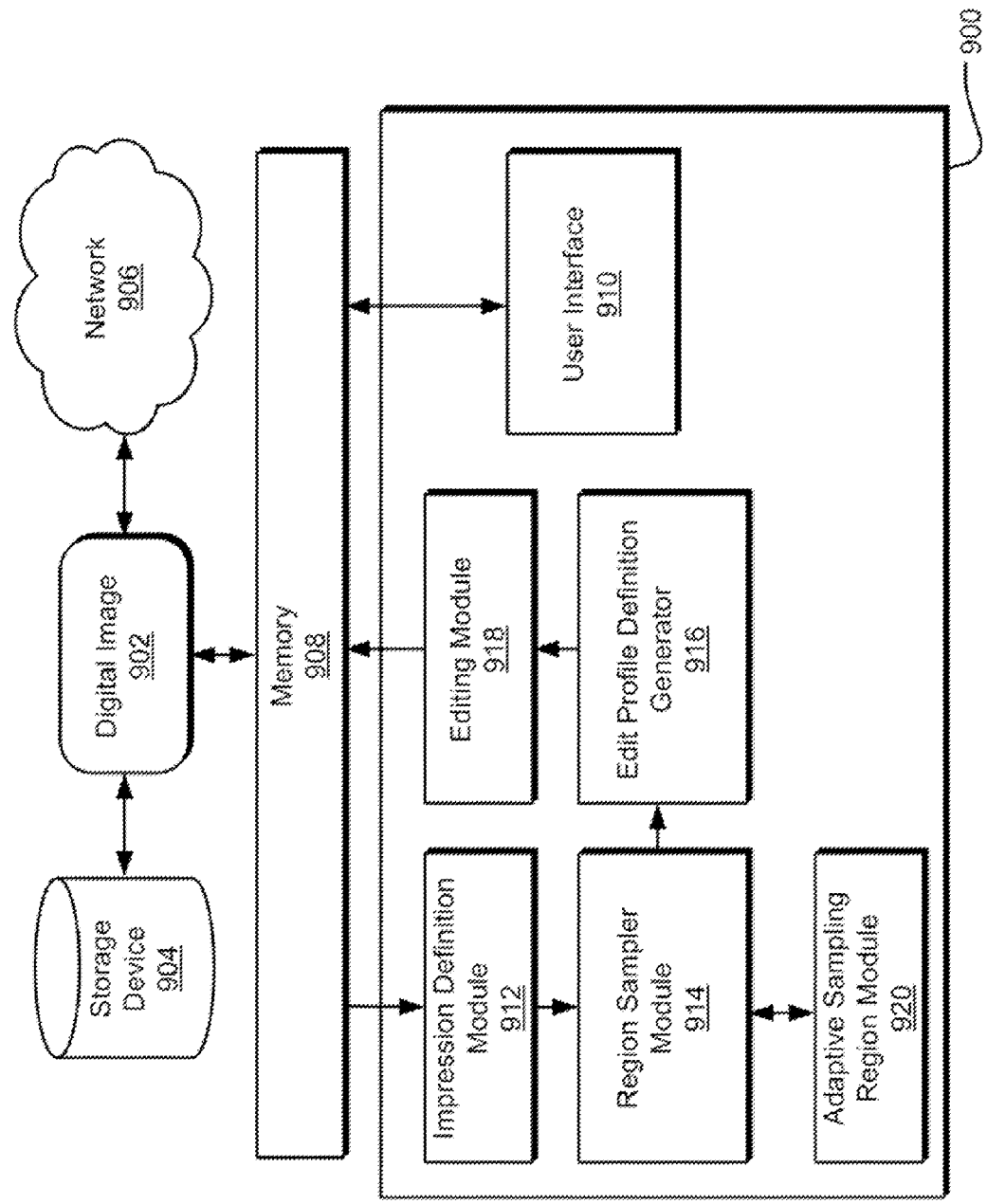
FIG. 9 illustrates an exemplary architecture of a region editing tool employing an adaptive sampling region.

In one implementation, operations 806, 808, 810, and 812 are performed by an adaptive sampling region module 920 of FIG. 9, although other implementations may architect the region editing tool to support an adaptive sampling region in an alternative configuration.

FIG. 9 illustrates an exemplary architecture of a region editing tool 900 employing an adaptive sampling region. In various implementations, modules may be structured as hardware or as software executing within a computer system. A digital image 902 may be represented by encoded data, such as in JPEG format, GIF format, or some other standard or proprietary format. The digital image 902 may be received from a persistent storage medium 904 (e.g., a magnetic or optical storage disk, or flash memory) or from a communications network 906 (e.g., the Internet or a local area network). The digital image 902 is transferred to another storage medium, such as memory 908 for access by the editing tool 900.

A user interface 910 can access the digital image 902 from the memory 908 and display it to a user. For example, FIG. 1 illustrates a user interface screenshot of an exemplary region editing tool. The user interface 910 may also receive input from the user, relative to the digital image, instructing that assorted editing operations be performed on an area of the digital image 902 as well as parameters for such operations, such as the location and dimensions of the tool impression.

The input is received by an impression definition module 912, which accesses the memory resident representation of the digital image 902, and communicates the location and dimensions of the tool impressions as well as the two or more subdivisions (i.e., component regions) therein. The subdivisions are differently located within the tool impression and therefore have at least one pixel difference between them. In one implementation, this impression definition occurs for each tool impression, whereas in other implementations, this impression definition may be applied to multiple tool impressions (e.g., to multiple distinct tool impressions or to a stroke of the tool impression across the image, which is interpreted as multiple individual tool impressions). For such aggregate tool impressions, first and second component regions may be determined in a variety of ways. One example is that tool impression regions that overlap a sampling (e.g., background) component region of any tool impression in the set are considered sampling component regions while all other tool impression regions are considered foreground component regions.

A region sampler module 914 samples the properties of the pixels in each region to produce a property distribution for each region. If an adaptive sampling region is employed; an adaptive sampling region module 920 interacts with the region sampler module 914 to iterate to a more optimal sampling region.

An edit profile definition module 916 classifies the property distributions of the regions to determine a number of edit classes to which an editing effect is applied differently. Given the edit classes, an editing module 918 applies the edit classes to individual pixels within the tool impression. Therefore, using the region erasure example, pixels having property values falling into the erasure class have their transparency values set to 100% (or some high transparency value), pixels having properties values falling into the partial erasure class have their transparency values set to a tapered value between 100% and 0%, and pixels having properties values falling into the unchanged class have their transparency values unchanged. The editing changes are saved to memory, from which the user interface 910 can retrieve the updated digital image data and display the changes to the user.

Figure 10:
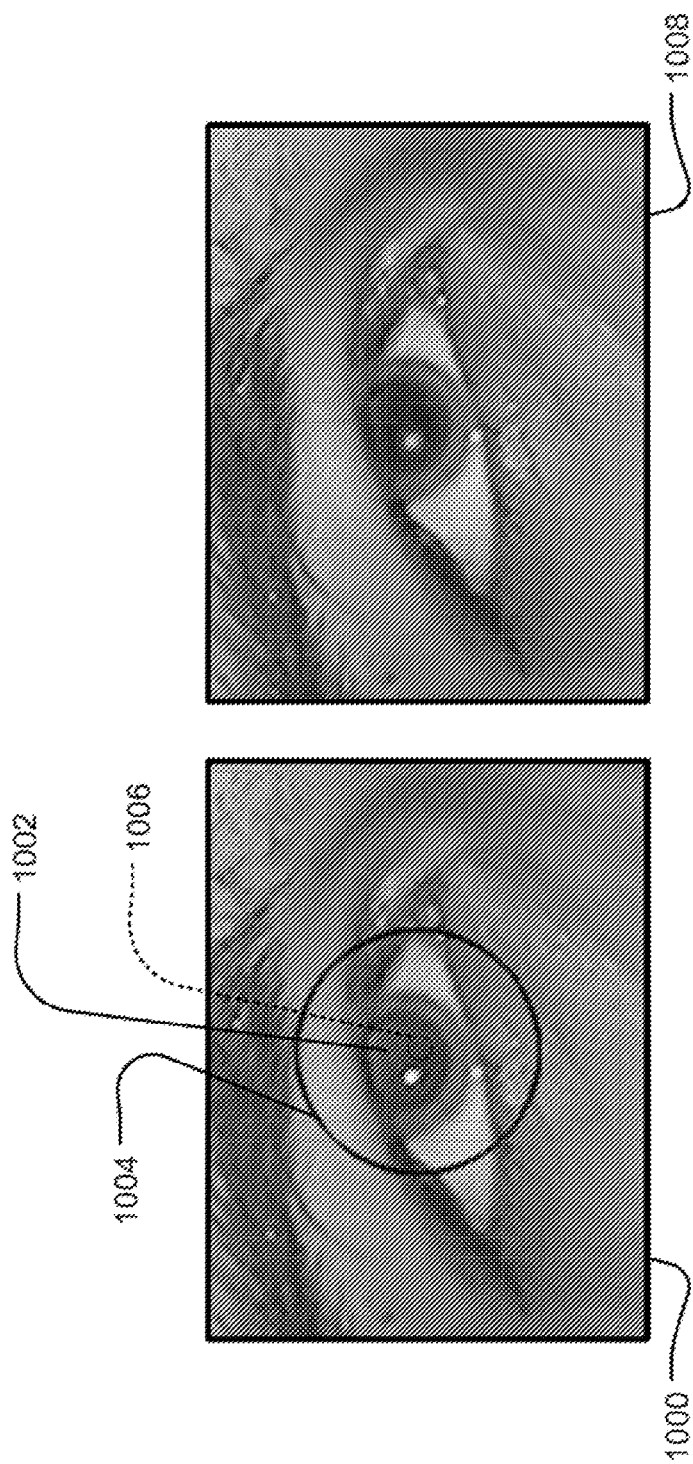
FIG. 10 illustrates a red-eye correction operation implemented using an adaptive sampling region.

FIG. 10 illustrates a red-eye correction operation implemented using an adaptive sampling region. in image 1000, the pupil 1002 appears unnaturally red from the reflection of a photographic flash or other light source. Using an adaptive sampling region, the user's placement of the tool impression 1004 and the associated sampling region 1006 may be imprecise, because the sampling region can expand, move, and otherwise adapt to sample the other similar pixels in the red region of the pupil. A result in which the editing operation replaces the edit region with a dark natural pupil color is shown in image 1008.

Figure 11:
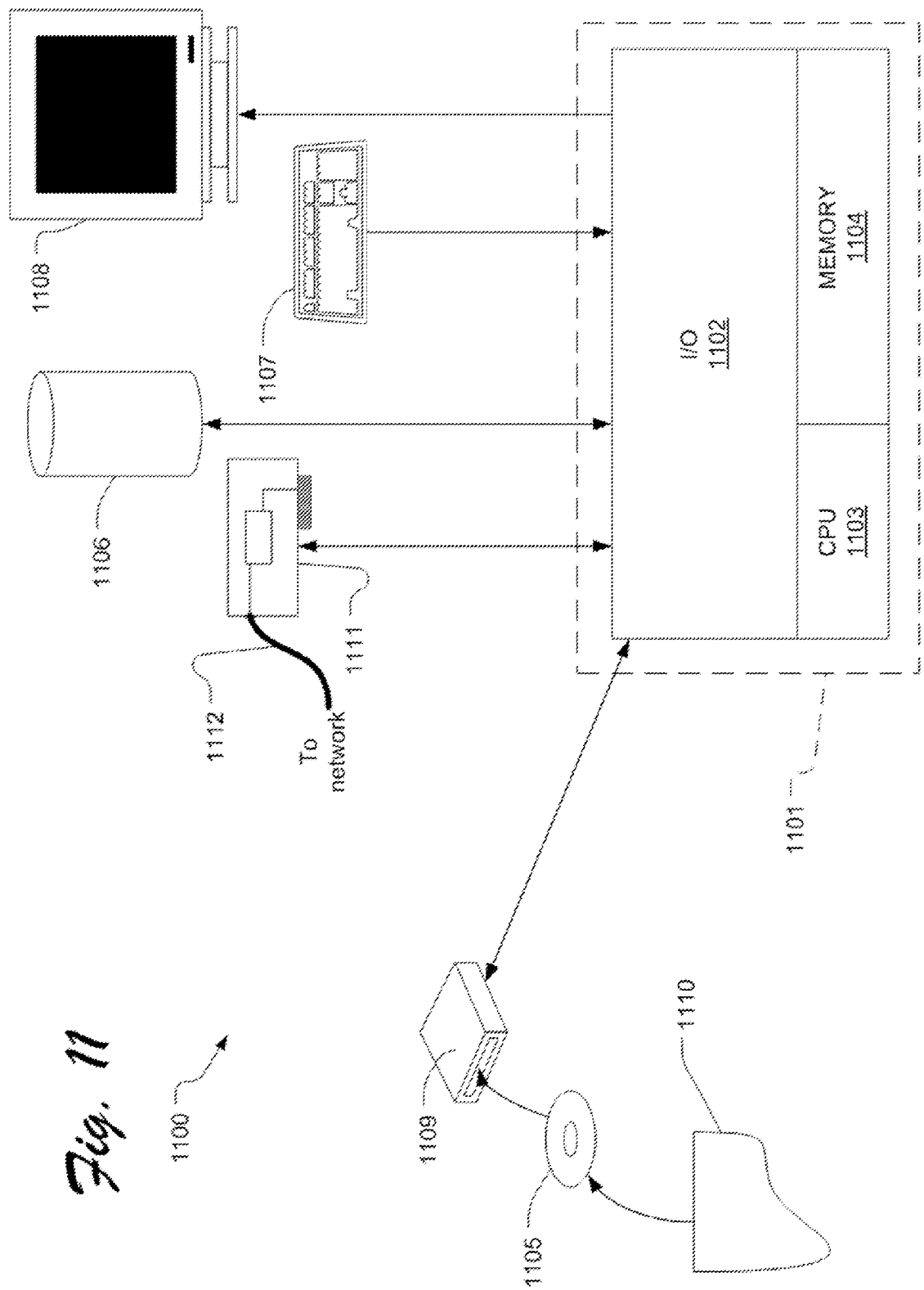
FIG. 11 illustrates an exemplary system useful for implementing an implementation of the described subject matter.

FIG. 11 depicts an exemplary general purpose computer capable of executing a program product. One operating environment in which the described system is potentially useful involves the general purpose computer, such as shown as computer 1113. in such a system, data and program files may be input to the computer, including without limitation by means of a removable or non-removable storage medium or a data signal propagated on a carrier wave (e.g., data packets over a communication network). The computer 1113 may be a conventional computer, a distributed computer, or any other type of computing device.

The computer 1113 can read data and program files, and execute the programs and access the data stored in the files. Some of the elements of an exemplary general purpose computer are shown in FIG. 11, wherein a processor 1101 is shown having an input/output (1/O) section 1102, at least one processing unit 1103 (e.g., a microprocessor or microcontroller), and a memory section 1104. The memory section 1104 may also be referred to as simply the memory, and may include without limitation read only memory (ROM) and Random access memory (RAM).

A basic input/output system (BIOS), containing the basic routines that help to transfer information between elements within the computer 1113, such as during start-up, is stored in memory 1104. The described computer program product may optionally be implemented in software modules, hardware modules, or firmware loaded in memory 1104 and/or stored on a configured CD-ROM 1108 or storage unit 1109, thereby transforming the computer system in FIG. 11 to a special purpose machine for implementing the described system.

The I/O section 1102 is connected to keyboard 1105, display unit 1106, disk storage unit 1109, and disk drive unit 1107, typically by means of a system or peripheral bus (not shown). The system bus may be any of several types of bus structures including a memory bus or memory controller, a peripheral bus, and a local bus using any of a variety of bus architectures. Generally, in contemporary systems, the disk drive unit 1107 is a CD-ROM drive unit capable of reading the CD-ROM medium 1108, which typically contains programs 1110 and data. Computer program products containing mechanisms to effectuate the systems and methods in accordance with the present invention may reside in the memory section 1104, on a disk storage unit 1109, or on the CD-ROM medium 1108 of such a system. Alternatively, disk drive unit 1107 may be replaced or supplemented by a floppy drive unit, a tape drive unit, or other storage medium drive unit. The network adapter 1111 is capable of connecting the computer system to a network via the network link 1112.

The drives and their associated computer-readable media provide nonvolatile storage of computer readable instructions, data structures, program modules and other data for the computer 1113. it should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

The computer 1113 may operate in a networked environment using logical connections to one or more remote computers. These logical connections are achieved by a communication device 1111 (e.g., such as a network adapter or modem) coupled to or incorporated as a part of the computer 1113; the described system is not limited to a particular type of communications device. Exemplary logical connections include without limitation a local-area network (LAN) and a wide-area network (WAN). Such networking environments are commonplace in office networks, enterprise-wide computer networks, intranets and the Internet, which are all exemplary types of networks.

In an exemplary implementation, an impression definition module, a region sampler module, an edit profile definition generator, an adaptive sampling region module, an adaptive sampling region module, and an editing module may be incorporated as part of the operating system, application programs, or other program modules executed by the CPU 1103. The digital image, the property distributions, thresholds, edit profiles, and edit classes may be stored as program data in memory section 1104, on a disk storage unit 1109, or on the CD-ROM medium 1108.

FIG. 12 illustrates a different exemplary modification of a sampling region. A digital image region 1200 includes several foreground objects (i.e., the balloons), which represent a general class of pixels that are not to be edited, and a background (i.e. the sky, which represents a general class of pixels that are to be edited. Both the foreground objects and the background may include multiple colors, textures, opacity values, etc. However, in the illustrated implementation, the background possesses a uniform or substantially uniform color distribution, which allows the adaptive region editing tool to adapt the sampling region in order to optimize the edit classification operation.

In one implementation, the user places a tool impression 1202 such that an outer tool impression region includes pixels of the foreground objects and a central sampling region 1204 includes pixels of the background, but substantially none of the pixels of the foreground objects, in order to guide the selective editing operation of the tool. A distribution graph 1206 depicts an exemplary pixel property distribution 1208 associated with the set of pixels encompassed by the sampling region 1204 and an exemplary pixel property distribution 1210 associated with the set of pixels residing in the outer region, between the periphery of the sampling region 1204 and the periphery of the tool impression 1202.

In contrast to the implementation illustrated in FIG. 7, the incremental modifications to the sampling region 1204 are not uniform and may include without limitation size-changes, shape-changes, translation (e.g., moving the center of the sampling region within the image), and orientation changes (e.g. rotation of the sampling region relative to the axes of the image). As shown in FIG. 12, the resulting modified sampling region 1212 in digital image region 1214 has expanded to encompass all of the contiguous pixels within the tool impression 1216 sharing substantially uniform pixel properties (in this case, colors). Expansion of region 1214 may be implemented, for example, as a flood fill operation in which pixels are added conditionally based on their satisfaction of a sampling criterion.

Therefore, in a manner similar to that of FIG. 7, a pixel property distribution graph 1218 associated with the modified sampling region 1212 shows that, as a result of the sampling region adaptation, the pixel properties of the uniform sampling region (e.g., "background") distribution 1220 are amplified and the overlapping portion of the outer region distribution 1222 is reduced, both effects being more significant than those in the example shown in FIG. 7. Again, given this modified distribution set, classification of pixels to be edited, pixels to be partially edited, and pixels not to be edited may simplified, and potentially may be more accurate. On the basis of this classification operation, an edit profile can be defined and the appropriate pixels can be edited by the adaptive region editing tool.

Figure 13:
FIG. 13 illustrates an exemplary erasure of a heavily textured background of a digital image using a static-sized sampling region.

FIG. 13 illustrates an exemplary erasure of a heavily textured background of a digital image using a near-uniformity sampling criterion and an adaptively-sized sampling region. Some image regions exhibit a texture so non-uniform that a simple near-uniformity sampling criterion will not produce acceptable results. For example, image 1300 exhibits a heavily textured background of green foliage, dark shadows, and brown stems. However, the extremely non-uniform nature of the pixels under the sampling region 1302 results in too narrow of a full-edit classification. Accordingly, the edited image 1300 shows unacceptable results.

Figure 14:
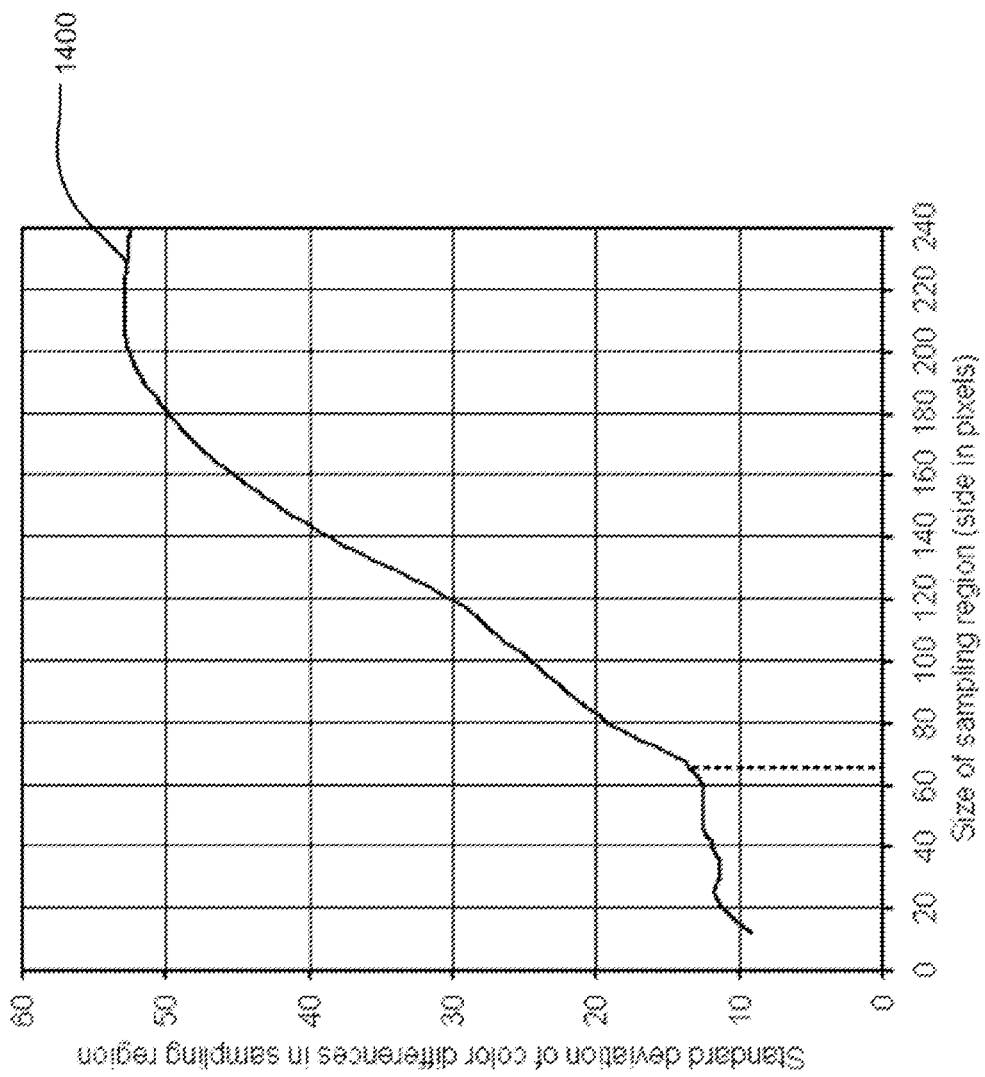
FIG. 14 illustrates an exemplary sampling trend in an adaptive sampling region application.

FIG. 14 illustrates an exemplary sampling trend 1400 in an adaptive sampling region application. By evaluating the standard deviation of color differences in the sampling region as the sampling region grows, an abrupt change in the trend may be detected at a side length of 66 pixels. in one implementation, the abrupt change can be detected by comparing the standard deviation difference between two adjacent or predetermined sampling region sizes to a given sampling trend criterion (a specific type of sampling criterion pertaining to trend analyses).

The variation or dispersion of the pixel properties within a sample region may be characterized in a variety of ways, either in a relative or absolute sense. Examples of absolute measures of variability include, but are not limited to, property range, interquartile range, mean absolute deviation, variance, standard deviation or average entropy.

Figure 15:
FIG. 15 illustrates an exemplary erasure of a heavily textured background of a digital image using a sampling trend criterion and an adaptively-sized sampling region.

FIG. 15 illustrates an exemplary erasure of a heavily textured background of a digital image 1500 using a sampling trend criterion and an adaptively-sized sampling region, The optimized sampling region size of 66 pixels per side leads to a broader full-edit class in the edit profile, thereby yielding a more intuitive result in which the background foliage is more accurately edited.

Other methods of determining an optimal sampling region size that is adaptive to image content are also contemplated. As discussed, the statistical analysis need not be confined simply to the entire sampling region. instead the statistics inside the sampling region may be compared to those within a region of growth around the original or previous sampling region. This adaptation procedure may also be iterative, wherein the previous sampling region and incremental modification region are combined prior to modifying the sampling region in the next iteration. In some cases, analysis of the incremental modification region may facilitate detection of an abrupt change by limiting the change analysis to incremental portions of the image.

Other statistical measures than standard deviation may be used. For example, the trend in a uniformity measure, such as color difference variance divided by mean color difference, may be used. Alternatively, the color distribution or smoothed distribution within the tool impression may be analyzed in more detail, such as by use of a histogram, including differential and integral histograms. The distribution may also be represented by means of mixture models.

More generally, classifiers of various types or clustering methods may be used to characterize the content under the tool impression. in the case of a brush tool, where individual impressions within a stroke may be updated as they are applied; it is preferred to use simple analysis methods for speed and responsiveness of the tool. However, more complex methods may also be used, for example, when the result of processing is drawn upon completion of the stroke and not during the stroke. In various implementations, it may also be sufficient for the adaptive sampling region methods to provide merely a sampling region that is improved over the original sampling region (e.g., an improved sampling region that is more characteristic of the background region intended by the user).

As previously discussed, it should be understood that the image properties being analyzed and edited are not limited to color. They may include other properties, such as transparency, or they may include explicit feature vectors that characterize, for instance, texture or another spatial property.

It should also be understood that the method of determining edit classes under the tool impression may be chosen independently of the criteria used to determine an improved size of a sample region. For example, the threshold for erasure may be chosen according to standard deviation of color differences as opposed to color range within the sample, while the sampling region size may be determined using a uniformity metric.

Figure 16:
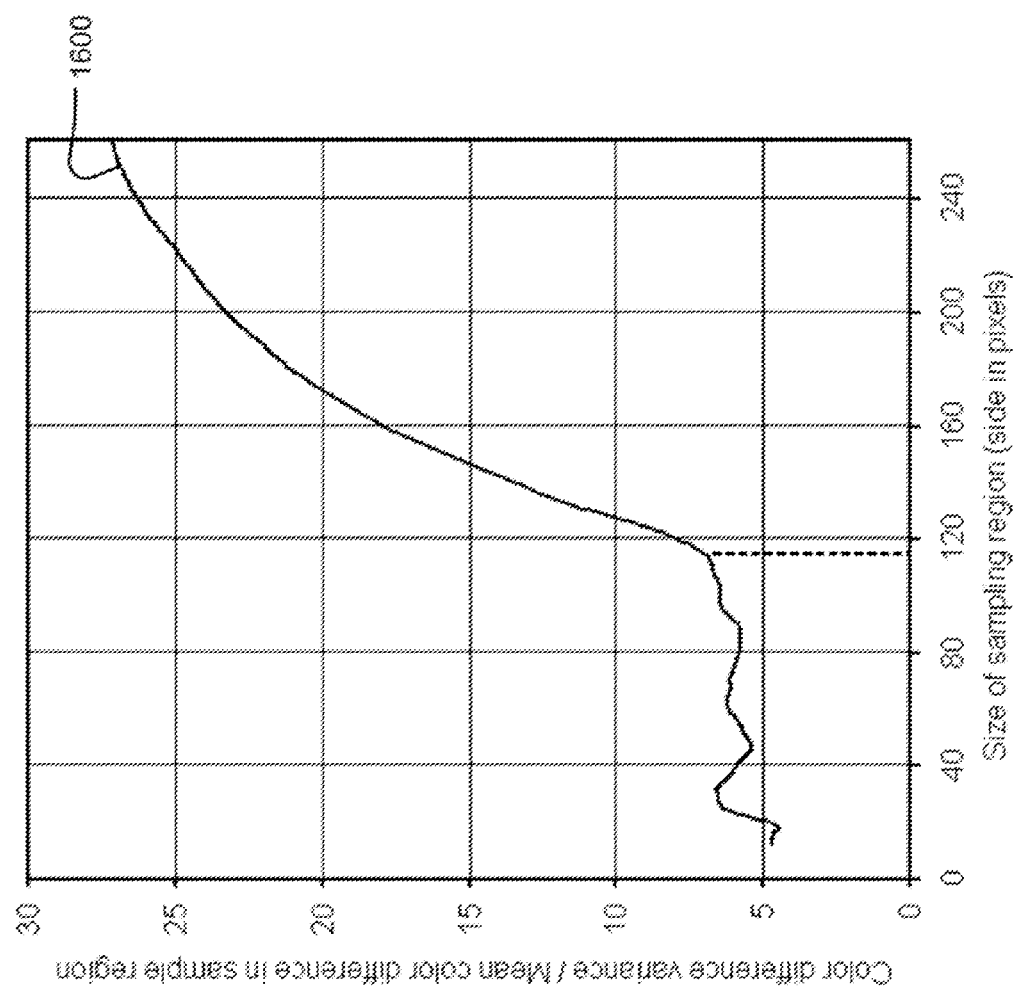
FIG. 16 illustrates a different exemplary sampling trend in an adaptive sampling region application.

FIG. 16 illustrates a different exemplary sampling trend 1600 in an adaptive sampling region application. By evaluating a uniformity metric (e.g., color difference variance/mean color difference) in the sampling region as the sampling region grows, an abrupt change in the sampling trend 1600 may be detected at a side length of 114 pixels. in one implementation, the abrupt change can be detected by comparing the uniformity metric difference between two adjacent or predetermined sampling region sizes to a given sampling trend criterion (a specific type of sampling criterion pertaining to trend analyses). In another implementation, an abrupt change in the character of the pixel property distribution may be detected by comparing a metric characterizing the property distribution with a predicted value of that metric obtained, for example, by exponential smoothing or a moving average of prior sampling property distribution metrics.

Figure 17:
FIG. 17 illustrates an exemplary blurring of a background of a digital image using a different sampling trend criterion and an adaptively-sized sampling region.

FIG. 17 illustrates an exemplary blurring of a background of a digital image 1700 using a different sampling trend criterion and an adaptively-sized sampling region. The editing operation shown in FIG. 17 is a blurring operation. A small sampling region (not shown) is likely to result in a slight or undetectable amount of blurring restricted to very small and separated pixel regions. An adaptive sampling region can expand the blurring effect to provide detectable results on the textured background.

However, an adaptive sampling region 1702 that is allowed to grow just short of an abrupt change in the uniformity metric trend (i.e., to 114 pixels per side) encompasses pixels exhibiting a much wider pixel property distribution. As such, the blur class is wider than for the small sampling region. As such, the blurring extends to the boy's leg, which the user perceives as a foreground object as opposed to background.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. in addition, data structures may be represented by individual objects, defined data structures, individual database tables, or combinations of associated database tables. A data field of a data structure may be represented or referenced by one or more associated database table fields.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
    (a) establishing a graphic edit process to be applied to a digital image;
    (b) establishing in dependence upon at least the graphic edit process a uniformity criterion;
    (c) defining a tool impression in the digital image, the tool impression including a first region encompassing a set of pixels;
    (d) sampling pixels in the first region to determine a first distribution of a pixel property of the pixels in the first region with a computer system;
    (e) determining whether the pixel property of the pixels in the first region satisfy a uniformity criterion with the computer system;
    (f) applying with the computer system the graphic edit process to the pixels within the first region upon determining that the uniformity criterion has been satisfied; and
    (g) executing with the computer system a graphic process region upon determining that the uniformity criterion has not been satisfied.

2. The method according to claim 1 wherein, the graphic process in step (g) comprises:
    sampling pixels in a second region within the tool impression to determine a second distribution of the pixel property with the computer system;
    determining at least two edit classes based on the first and second distributions with the computer system; and
    applying with the computer system a first graphic editing operation to pixels in a first edit class and a second graphic editing operation to pixels in a second edit class.

3. The method according to claim 2 wherein,
    the graphic process in step (g) comprises:
    processing the first distribution of the pixel property to determine at least two edit classes of the pixels within the first region with the computer system;
    applying with the computer system a first graphic editing operation to pixels in a first edit class and a second graphic editing operation to pixels in a second edit class.

4. The method according to claim 1 wherein,
    step (e) further comprises:
    (i) modifying with the computer system the first region to encompass a set of additional pixels in the digital image to generate a modified first region;
    (ii) determining a second distribution of the pixel property based on the pixels in the modified first region with the computer system;
    (iii) determining with the computer system by at least one of comparison of first and second distributions and the second distribution whether the pixel property is uniform within the tool impression;
    (iv) repeating steps (i) to (iii) upon determining that the uniformity criterion has been satisfied; and
    (v) removing with the computer system the set of additional pixels upon determining that the uniformity criterion has not been satisfied.

5. The method according to claim 1 further comprising;
    adjusting the uniformity criterion in dependence upon at least one of the first distribution of a pixel property of the pixels in the first region, the digital image, an aspect of the tool impression, a user input, and a factor relating to user perception prior to determining whether the uniformity criterion is satisfied.

6. The method according to claim 5 wherein,
    the factor relating to user perception relates to at least one of color and texture.

7. The method according to claim 1 wherein,
the uniformity criterion is defined in respect of a statistical description of a distribution of a pixel property.

8. A non-transitory tangible computer readable medium encoding a computer program, the computer program for execution by a computer system, the computer program relating to a method comprising:
   (a) establishing a graphic edit process to be applied to a digital image;
   (b) establishing in dependence upon at least the graphic edit process a uniformity criterion;
   (c) defining a tool impression in the digital image, the tool impression including a first region encompassing a set of pixels;
   (d) sampling pixels in the first region to determine a first distribution of a pixel property of the pixels in the first region with the computer system;
   (e) determining whether the pixel property of the pixels in the first region satisfy a uniformity criterion with the computer system;
   (f) applying with the computer system the graphic edit process to the pixels within the first region upon determining that the uniformity criterion has been satisfied; and
   (g) executing with the computer system a graphic process region upon determining that the uniformity criterion has not been satisfied.

9. The non-transitory tangible computer readable medium encoding a computer program according to claim 8 wherein, the graphic process in step (g) comprises:
   sampling pixels in a second region within the tool impression to determine a second distribution of the pixel property with the computer system;
   determining at least two edit classes based on the first and second distributions with the computer system; and
   applying with the computer system a first graphic editing operation to pixels in a first edit class and a second graphic editing operation to pixels in a second edit class.

10. The non-transitory tangible computer readable medium encoding a computer program according to claim 9 wherein, the graphic process in step (g) comprises:
   processing the first distribution of the pixel property to determine at least two edit classes of the pixels within the first region with the computer system;
   applying with the computer system a first graphic editing operation to pixels in a first edit class and a second graphic editing operation to pixels in a second edit class.

11. The non-transitory tangible computer readable medium encoding a computer program according to claim 8 wherein,
   step (e) further comprises:
   (i) modifying with the computer system the first region to encompass a set of additional pixels in the digital image to generate a modified first region;
   (ii) determining a second distribution of the pixel property based on the pixels in the modified first region with the computer system;
   (iii) determining with the computer system by at least one of comparison of first and second distributions and the second distribution whether the pixel property is uniform within the tool impression;
   (iv) repeating steps (i) to (iii) upon determining that the uniformity criterion has been satisfied; and
   (v) removing with the computer system the set of additional pixels upon determining that the uniformity criterion has not been satisfied.

12. The non-transitory tangible computer readable medium encoding a computer program according to claim 8 wherein;
   adjusting the uniformity criterion in dependence upon at least one of the first distribution of a pixel property of the pixels in the first region, the digital image, an aspect of the tool impression, a user input, and a factor relating to user perception prior to determining whether the uniformity criterion is satisfied.

13. The non-transitory tangible computer readable medium encoding a computer program according to claim 12 wherein;
   the factor relating to user perception relates to at least one of color and texture.

14. The non-transitory tangible computer readable medium encoding a computer program according to claim 8 wherein;
   the uniformity criterion is defined in respect of a statistical description of a distribution of a pixel property.

15. A method comprising:
   (a) establishing a graphic edit process to be applied to a digital image;
   (b) establishing in dependence upon at least the graphic edit process a uniformity criterion;
   (c) defining a region in the digital image;
   (d) sampling pixels in a first portion of the region to determine a first distribution of a pixel property of the pixels in the first portion with a computer system;
   (e) sampling pixels in a second portion of the region to determine a second distribution of a pixel property of the pixels in the second portion with a computer system;
   (f) determining whether the pixel property of the pixels within the region satisfy a uniformity criterion with the computer system in dependence upon the first and second distributions of the pixel property;
   (g) applying with the computer system the graphic edit process to the pixels within the region upon determining that the uniformity criterion has been satisfied; and
   (h) executing with the computer system a graphic process region upon determining that the uniformity criterion has not been satisfied.

16. The method according to claim 15 wherein, the graphic process in step (h) comprises:
   generating a third distribution of the pixel property relating to the region of the digital image to determine at least two edit classes of the pixels within the first region with the computer system; determining at least two edit classes based on the first, second, and third distributions with the computer system; and applying with the computer system a first graphic editing operation to pixels in a first edit class and a second graphic editing operation to pixels in a second edit class.

17. The method according to claim 15 wherein,
   step (f) further comprises:
   (i) upon determining that the uniformity criterion has not been satisfied modifying the uniformity criterion in dependence upon at least one of the first distribution of the pixel property, the second distribution of the pixel property, a predetermined factor, and a user input; and
   (ii) re-determining whether the pixel property of the pixels within the region satisfy the modified uniformity criterion with the computer system in dependence upon the first and second distributions of the pixel property.

18. The method according to claim 15 wherein,
step (b) comprises establishing the uniformity criterion in dependence upon at least one of the digital image, an aspect of the region, a user input, and a factor relating to user perception prior to determining whether the uniformity criterion is satisfied.

19. The method according to claim 18 wherein,
the factor relating to user perception relates to at least one of color and texture.

20. The method according to claim 15 wherein,
the uniformity criterion is defined in respect of a statistical description of a distribution of a pixel property.

\* \* \* \* \*

UNITED STATES PATENT AND TRADEMARK OFFICE
CERTIFICATE OF CORRECTION

PATENT NO. : 8,233,725 B2
APPLICATION NO. : 13/098583
DATED : July 31, 2012
INVENTOR(S) : Zaklika et al.

It is certified that error appears in the above-identified patent and that said Letters Patent is hereby corrected as shown below:

In Detailed Description:

Column 12, Line 63, please delete "$T_1 k \times Integ$" and insert -- $T_1 = k \times Integ$ -- therefor.

Signed and Sealed this
Twenty-ninth Day of January, 2013

David J. Kappos
*Director of the United States Patent and Trademark Office*